(12) United States Patent
Maruhashi

(10) Patent No.: US 12,009,766 B2
(45) Date of Patent: Jun. 11, 2024

(54) MOTOR CONTROL DEVICE AND ELECTRIC POWER STEERING DEVICE

(71) Applicant: NSK LTD., Tokyo (JP)

(72) Inventor: Akio Maruhashi, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/277,265

(22) PCT Filed: Mar. 3, 2023

(86) PCT No.: PCT/JP2023/008129
§ 371 (c)(1),
(2) Date: Aug. 15, 2023

(87) PCT Pub. No.: WO2023/223631
PCT Pub. Date: Nov. 23, 2023

(65) Prior Publication Data
US 2024/0039453 A1    Feb. 1, 2024

(30) Foreign Application Priority Data

| May 20, 2022 | (JP) | 2022-082885 |
| Jul. 29, 2022 | (JP) | 2022-121571 |
| Sep. 15, 2022 | (JP) | 2022-147265 |

(51) Int. Cl.
*H02P 29/68* (2016.01)
*B62D 5/04* (2006.01)
*H02P 27/08* (2006.01)

(52) U.S. Cl.
CPC .............. *H02P 29/68* (2016.02); *B62D 5/046* (2013.01); *B62D 5/049* (2013.01); *B62D 5/0496* (2013.01); *H02P 27/08* (2013.01)

(58) Field of Classification Search
CPC .... H02P 1/54; H02P 1/423; H02P 1/46; H02P 1/42; H02P 29/66; H02P 21/14; H02P 23/07; H02P 25/00; H02P 25/062; H02P 25/064; H02P 26/28; H02P 1/24; H02P 29/68; H02P 25/22; H02P 29/60;
(Continued)

(56) References Cited

U.S. PATENT DOCUMENTS 6,397,609 B1   6/2002  Shikata et al.
2016/0325777 A1  11/2016  Mori
(Continued)

FOREIGN PATENT DOCUMENTS

| CN | 110506389 A | 11/2019 |
| CN | 113497585 A | 10/2021 |

(Continued)

OTHER PUBLICATIONS

International Search Report for PCT/JP2023/008129 dated May 9, 2023 (PCT/ISA/210).
(Continued)

*Primary Examiner* — Antony M Paul
(74) *Attorney, Agent, or Firm* — Sughrue Mion, PLLC

(57) ABSTRACT

A motor control device includes temperature detection elements that are mounted on a circuit board on which a first power conversion circuit and a second power conversion circuit are mounted and are arranged at a position between the first power conversion circuit and the second power conversion circuit.

11 Claims, 14 Drawing Sheets

(58) Field of Classification Search
CPC ........ H02P 27/06; H02P 29/024; H02P 21/22; H02P 27/08; H02P 29/032; H02P 21/00; H02P 25/022; H02P 2006/045; H02P 21/0003; H02P 29/027; H02P 29/64; B60K 6/485; B60K 1/02; H02M 1/327; B62D 5/0496; B62D 5/0463; B62D 5/0487; B62D 5/046; B62D 5/0481; B62D 5/0409

See application file for complete search history.

(56) References Cited

U.S. PATENT DOCUMENTS

| | | | |
|---|---|---|---|
| 2019/0047613 | A1 | 2/2019 | Kano et al. |
| 2019/0337559 | A1 | 11/2019 | Tsubaki et al. |
| 2020/0055543 | A1 | 2/2020 | Kadowaki et al. |
| 2021/0313923 | A1 | 10/2021 | Niwa et al. |

FOREIGN PATENT DOCUMENTS

| | | | |
|---|---|---|---|
| EP | 3493390 A1 | 6/2019 | |
| JP | 4135437 B2 | 8/2008 | |
| JP | 4474754 B2 | 3/2010 | |
| JP | 2012-148629 A | 8/2012 | |
| JP | 2015061458 A | * 3/2015 | ........... B62D 5/0403 |
| JP | 2020-148639 A | 9/2020 | |
| JP | 2021-164364 A | 10/2021 | |
| WO | 2014/136166 A1 | 9/2014 | |
| WO | 2015/136918 A1 | 9/2015 | |
| WO | 2018/198740 A1 | 11/2018 | |

OTHER PUBLICATIONS

Written Opinion for PCT/JP2023/008129 dated May 9, 2023 (PCT/ISA/237).
Supplemental European Search Report dated Mar. 14, 2024, issued in European Application No. 23745033.3.
Communication from the European Patent Office issued Mar. 26, 2024, in corresponding European Application No. 23745033.3.

* cited by examiner

MOTOR CONTROL DEVICE AND ELECTRIC POWER STEERING DEVICE

CROSS REFERENCE TO RELATED APPLICATIONS

This application is a National Stage of International Application No. PCT/JP2023/008129 filed Mar. 3, 2023, claiming priorities based on Japanese Patent Application No. 2022-082885 filed May 20, 2022, Japanese Patent Application No. 2022-121571 filed Jul. 29, 2022 and Japanese Patent Application No. 2022-147265 filed Sep. 15, 2022.

TECHNICAL FIELD

The present invention relates to a motor control device and an electric power steering device.

BACKGROUND ART

In PTLs 1 to 3 described below, electric power steering devices including a temperature sensor for detecting temperature in a vicinity of a circuit board that drives a motor generating steering assist force are described.

In addition, in PTL 4 described below, an electric power steering device that supplies currents to drive a motor from a plurality of sets of inverters (power conversion circuits) is described.

CITATION LIST

Patent Literature

PTL 1: JP 4135437 B
PTL 2: JP 2012-148629 A
PTL 3: JP 2020-148639 A
PTL 4: WO 2015/136918 A

SUMMARY OF INVENTION

Technical Problem

Since a power conversion circuit includes a heat generating component, there is a risk that the power conversion circuit is damaged due to overheat. By disposing a temperature detection element on a circuit board on which a power conversion circuit is mounted and, when temperature detected by the temperature detection element becomes greater than or equal to a supposed temperature, limiting output current from the power conversion circuit, damage to the power conversion circuit due to overheat can be prevented.

When an electronic power steering device includes a plurality of sets of power conversion circuits as described in the above-described PTL 4, it is preferable to be able to appropriately detect a temperature abnormality in each of the power conversion circuits.

The present invention has been made focusing on the above-described problem, and an object of the present invention is to, in a motor control device in which a first power conversion circuit and a second power conversion circuit are mounted on the same circuit board, improve detection precision of a temperature abnormality in each of the first power conversion circuit and the second power conversion circuit.

Solution to Problem

In order to achieve the above-described object, according to an aspect of the present invention, there is provided a motor control device including: a circuit board; a first power conversion circuit mounted on the circuit board and configured to supply current to drive a motor; a second power conversion circuit mounted on the circuit board and configured to supply current to drive a motor identical to or different from a motor to which current is supplied by the first power conversion circuit; a temperature detection circuit including a temperature detection element; and a control circuit configured to limit current supplied by the first power conversion circuit and current supplied by the second power conversion circuit, based on temperature detected by the temperature detection circuit, wherein the temperature detection element is mounted on the circuit board on which the first power conversion circuit and the second power conversion circuit are mounted and are arranged at a position between the first power conversion circuit and the second power conversion circuit.

According to an aspect of the present invention, there is provided an electric power steering device including: the motor control device described above; a motor controlled by the motor control device, wherein the electric power steering device provides a steering system of a vehicle with steering assist force by the motor.

Advantageous Effects of Invention

According to the present invention, in a motor control device in which a first power conversion circuit and a second power conversion circuit are mounted on the same circuit board, it is possible to improve detection precision of a temperature abnormality in each of the first power conversion circuit and the second power conversion circuit.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment (Configuration)

Figure 1:
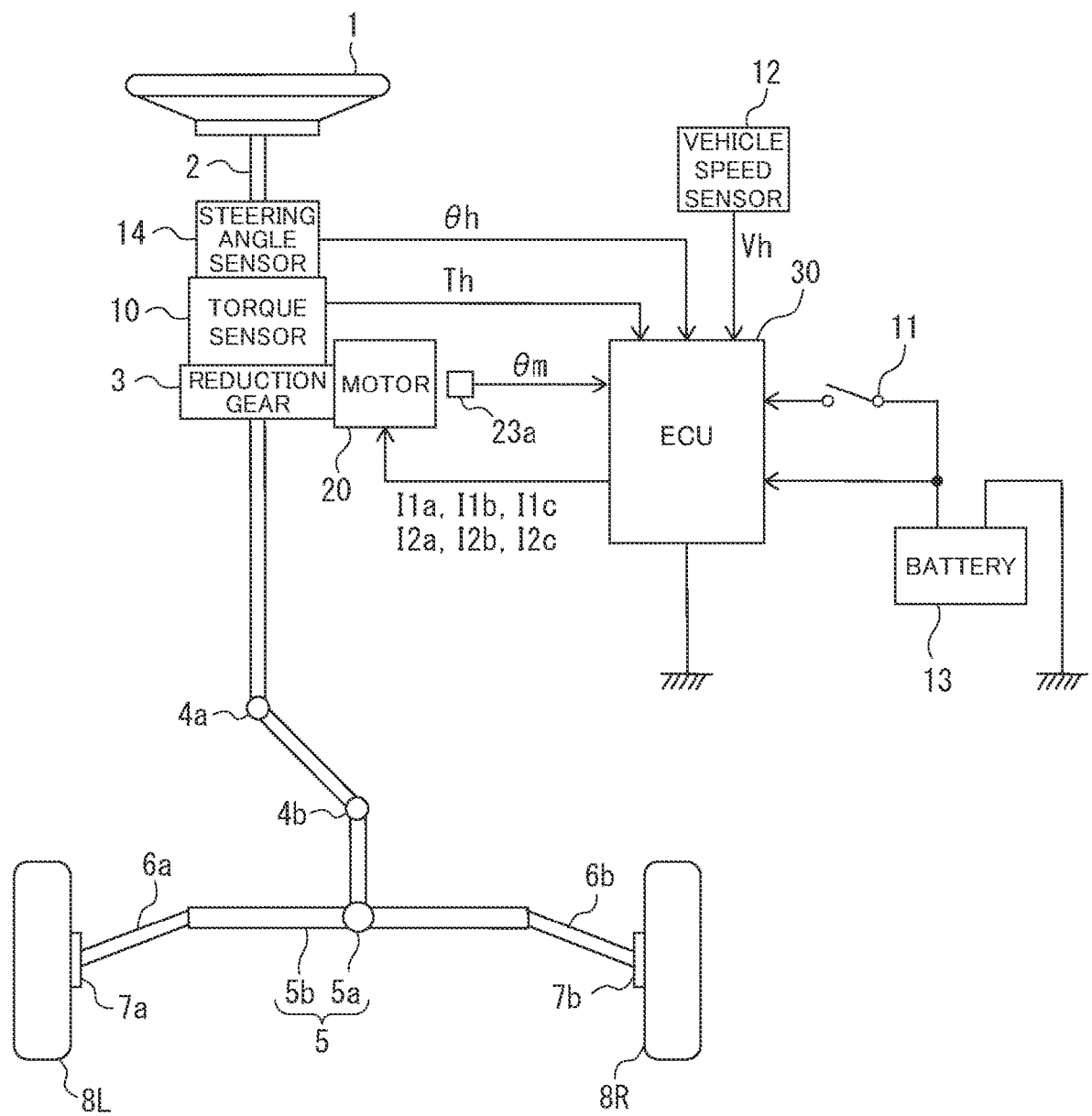
FIG. 1 is a configuration diagram illustrative of an outline of an example of an electric power steering device of embodiments.

FIG. 1 is a configuration diagram illustrative of an outline of an example of an electric power steering (EPS) device of embodiments. A steering shaft (steering wheel shaft) 2 of a steering wheel 1 is connected to steered wheels 8L and 8R by way of a reduction gear (worm gear) 3 that constitutes a speed reduction mechanism, universal joints 4a and 4b, a pinion rack mechanism 5, and tie rods 6a and 6b and further via hub units 7a and 7b.

The pinion rack mechanism 5 includes a pinion 5a that is coupled to a pinion shaft to which steering force is transmitted from the universal joint 4b and a rack 5b that meshes with the pinion 5a, and converts rotational motion transmitted to the pinion 5a to linear motion in the vehicle width direction by means of the rack 5b.

To the steering shaft 2, a torque sensor 10 configured to detect steering torque Th is disposed. To the steering shaft 2, a steering angle sensor 14 configured to detect a steering angle θh of the steering wheel 1 is also disposed.

A motor 20 configured to assist steering force of the steering wheel 1 is also connected to the steering shaft 2 via the reduction gear 3. The motor 20 may be, for example, a polyphase motor. Although, in the following description, an example of a three-phase motor having double windings in which first coils and second coils are wound in the same motor housing and a common rotor is rotated by the two groups of coils will be described, the motor 20 may be a motor other than a double-winding motor and the number of phases of the motor 20 does not have to be three. A plurality of motors 20 configured to assist steering force of the steering wheel 1 may be connected to the same steering shaft 2.

To an electronic control unit (ECU) 30 configured to control the electric power steering device, power is supplied from a battery 13 and an ignition key signal is also input via an ignition switch 11.

The ECU 30 performs calculation of a current command value of an assist control command, based on steering torque Th detected by the torque sensor 10, vehicle speed Vh detected by a vehicle speed sensor 12, and a steering angle θh detected by the steering angle sensor 14 and controls current to be supplied to the motor 20 (A-phase current I1a, B-phase current I1b, and C-phase current I1c flowing through the first coils and A-phase current I2a, B-phase current I2b, and C-phase current I2c flowing through the second coils) by a voltage control command value obtained by performing compensation and the like on the calculated current command value. The ECU 30 is an example of a "motor control device" described in the claims.

Note that the steering angle sensor 14 is not an essential component and the steering angle θh may be calculated by adding a torsion angle of a torsion bar in the torque sensor 10 to a product of a motor rotation angle θm obtained from a rotation angle sensor 23a configured to detect a rotation angle of the rotation shaft of the motor 20 and a gear ratio of the reduction gear 3. As the rotation angle sensor 23a, for example, a resolver that detects a rotational position of a motor or a magnetic sensor that detects a magnetic field of a magnet attached to the rotation shaft of the motor 20 can be made use of. In addition, a turning angle of the steered wheels 8L and 8R may be used in place of the steering angle θh. The turning angle may be detected by, for example, detecting a displacement amount of the rack 5b.

The ECU 30 includes, for example, a computer including a processor and peripheral components, such as a storage device. The processor may be, for example, a central processing unit (CPU) or a micro-processing unit (MPU).

The storage device may include any one of a semiconductor storage device, a magnetic storage device, and an optical storage device. The storage device may include registers, a cache memory, or a memory, such as a read only memory (ROM) and a random access memory (RAM) that are used as a main storage device.

Functions of the ECU 30, which will be described below, are achieved by, for example, the processor of the ECU 30 executing computer programs stored in the storage device.

Note that the ECU 30 may be formed by use of dedicated hardware for executing each type of information processing that will be described below.

For example, the ECU 30 may include functional logic circuits that are set in a general-purpose semiconductor integrated circuit. For example, the ECU 30 may have a programmable logic device (PLD), such as a field-programmable gate array (FPGA).

Figure 2:
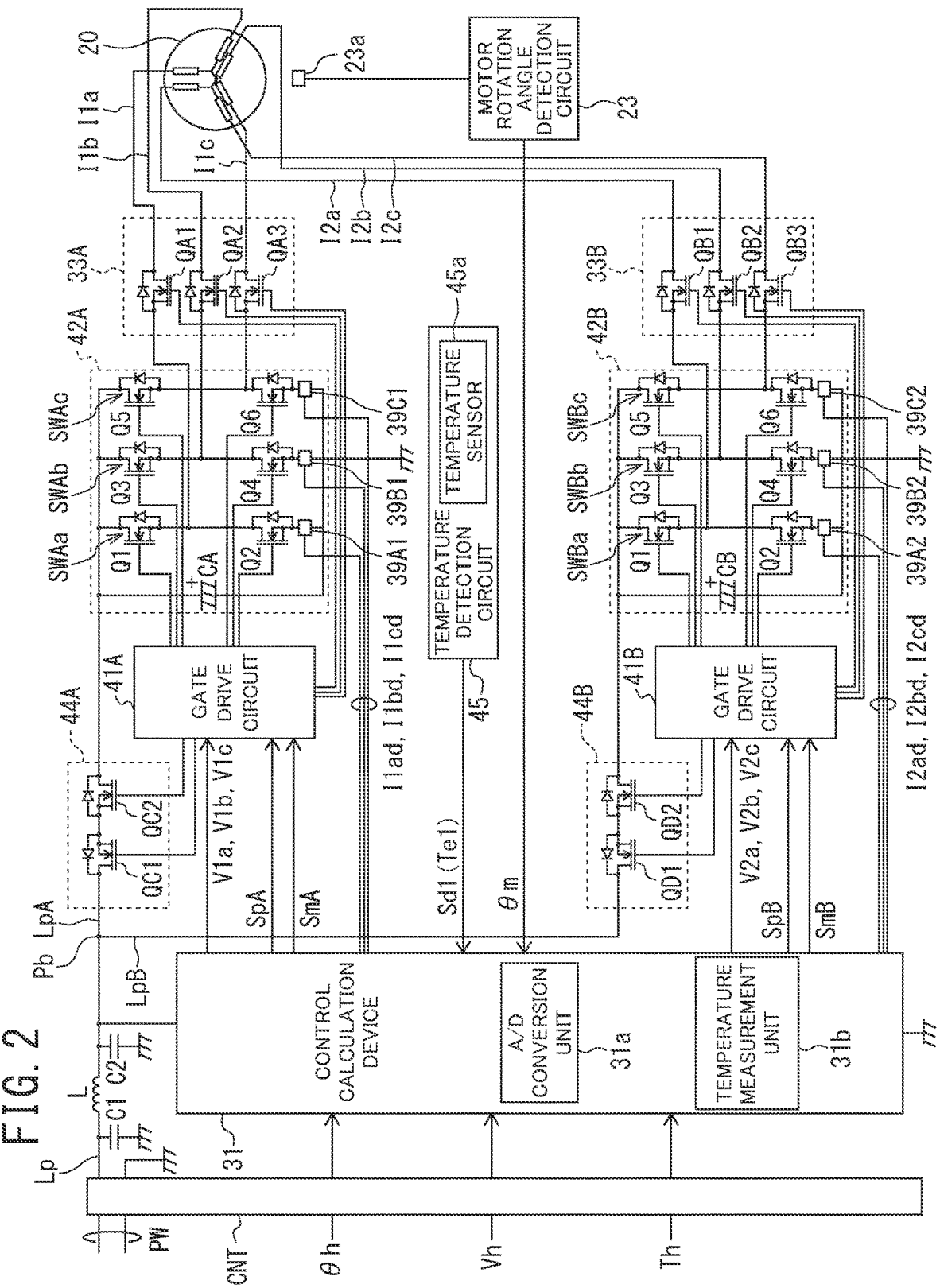
FIG. 2 is a configuration diagram illustrative of an outline of an example of an electric control unit (ECU) of a first embodiment.

FIG. 2 is a configuration diagram illustrative of an outline of an example of the ECU 30 of a first embodiment. The ECU 30 includes a motor rotation angle detection circuit 23, a control calculation device 31, a first motor current cut-off circuit 33A, a second motor current cut-off circuit 33B, a first gate drive circuit 41A, a second gate drive circuit 41B, a first power conversion circuit (first inverter) 42A, a second power conversion circuit (second inverter) 42B, a first power source cut-off circuit 44A, a second power source cut-off circuit 44B, and a temperature detection circuit 45.

To the ECU 30, a power wiring PW that transmits power from the battery 13 via a connector CNT is connected. A positive electrode-side line Lp of the power wiring PW is connected to the control calculation device 31 by way of a noise filter circuit that is formed by a choke coil L and ceramic capacitors C1 and C2, as well as branching into a first positive electrode-side line LpA and a second positive electrode-side line LpB at a branch point Pb.

The first positive electrode-side line LpA and the second positive electrode-side line LpB are power source lines supplying the first power conversion circuit 42A and the second power conversion circuit 42B with power and are connected to the first power source cut-off circuit 44A and the second power source cut-off circuit 44B, respectively.

One end of the choke coil L is connected to the positive electrode-side line Lp and one end of the ceramic capacitor C1, the other end of the choke coil L is connected to one end of the ceramic capacitor C2, the control calculation device 31, and the branch point Pb, and the other ends of the ceramic capacitors C1 and C2 are grounded. On the other hand, a negative electrode-side line of the power wiring PW is connected to a grounding wire of the ECU 30.

To the control calculation device 31, signals representing the steering torque Th detected by the torque sensor 10, the vehicle speed Vh detected by the vehicle speed sensor 12, and the steering angle θh detected by the steering angle sensor 14 are transmitted via the connector CNT.

The control calculation device 31 calculates current command values that are control target values of driving currents of the motor 20, based on at least the steering torque Th and outputs voltage control command values V1a, V1b, V1c, V2a, V2b, and V2c obtained by performing compensation and the like on the current command values to the first gate drive circuit 41A and the second gate drive circuit 41B. The voltage control command values V1a, V1b, and V1c are an A-phase voltage control command value, a B-phase voltage command value, and a C-phase voltage command value of the first coils, respectively, and the voltage control command values V2a, V2b, and V2c are an A-phase voltage control command value, a B-phase voltage command value, and a C-phase voltage command value of the second coils, respectively.

The first power source cut-off circuit 44A has a series circuit configuration in which two FETs QC1 and QC2 have sources connected to each other and parasitic diodes are connected in the reverse direction. A drain of the FET QC1 is connected to the first positive electrode-side line LpA, and a drain of the FET QC2 is connected to a drain of each of FETs Q1, Q3, and Q5 in the first power conversion circuit 42A. The control calculation device 31 outputs a control signal SpA for controlling conduction and cut-off of the first power source cut-off circuit 44A to the first gate drive circuit 41A. The first gate drive circuit 41A outputs gate signals for the FETs QC1 and QC2 according to the control signal SpA and thereby flows or cuts off power source current from the battery 13 to the first power conversion circuit 42A.

The second power source cut-off circuit 44B has a series circuit configuration in which two FETs QD1 and QD2 have sources connected to each other and parasitic diodes are connected in the reverse direction. A drain of the FET QD1 is connected to the second positive electrode-side line LpB, and a drain of the FET QD2 is connected to a drain of each of FETs Q1, Q3, and Q5 in the second power conversion circuit 42B. The control calculation device 31 outputs a control signal SpB for controlling conduction and cut-off of the second power source cut-off circuit 44B to the second gate drive circuit 41B. The second gate drive circuit 41B outputs gate signals for the FETs QD1 and QD2 according to the control signal SpB and thereby flows or cuts off power source current from the battery 13 to the second power conversion circuit 42B.

When the voltage control command values V1a, V1b, and V1c are input from the control calculation device 31, the first gate drive circuit 41A forms six gate signals that are generated by pulse width modulation (PWM) based on the voltage control command values V1a, V1b, and V1c and triangular-wave carrier signals. The first gate drive circuit 41A outputs the gate signals to the first power conversion circuit 42A.

When the voltage control command values V2a, V2b, and V2c are input from the control calculation device 31, the second gate drive circuit 41B forms six gate signals that are generated by pulse width modulation (PWM) based on the voltage control command values V2a, V2b, and V2c and triangular-wave carrier signals. The second gate drive circuit 41B outputs the gate signals to the second power conversion circuit 42B.

The first power conversion circuit 42A includes three switching arms SWAa, SWAb, and SWAc each of which is formed by FETs serving as switching elements and an electrolytic capacitor CA.

The switching arms SWAa, SWAb, and SWAc are connected in parallel with one another. The switching arm SWAa of the A-phase includes the FETs Q1 and Q2 that are connected in series, the switching arm SWAb of the B-phase includes the FETs Q3 and Q4 that are connected in series, and the switching arm SWAc of the C-phase includes the FETs Q5 and Q6 that are connected in series. A gate signal output from the first gate drive circuit 41A is input to a gate of each of the FETs Q1 to Q6, and the gate signals cause the A-phase current I1a, the B-phase current I1b, and the C-phase current I1c to be flowed from connection points between the FETs in the switching arms SWAa, SWAb, and SWAc to an A-phase winding, a B-phase winding, and a C-phase winding of the first coils of the motor 20 via the first motor current cut-off circuit 33A, respectively.

The electrolytic capacitor CA has a noise removal function and power supply assist function for the first power conversion circuit 42A.

The second power conversion circuit 42B includes three switching arms SWBa, SWBb, and SWBc each of which is formed by FETs serving as switching elements and an electrolytic capacitor CB.

The switching arms SWBa, SWBb, and SWBc are connected in parallel with one another. The switching arm SWBa of the A-phase includes the FETs Q1 and Q2 that are connected in series, the switching arm SWBb of the B-phase includes the FETs Q3 and Q4 that are connected in series, and the switching arm SWBc of the C-phase includes the FETs Q5 and Q6 that are connected in series. A gate signal output from the second gate drive circuit 41B is input to a gate of each of the FETs Q1 to Q6, and the gate signals cause the A-phase current I2a, the B-phase current I2b, and the C-phase current I2c to be flowed from connection points between the FETs in the switching arms SWBa, SWBb, and SWBc to an A-phase winding, a B-phase winding, and a C-phase winding of the second coils of the motor 20 via the second motor current cut-off circuit 33B, respectively.

The electrolytic capacitor CB has a noise removal function and power supply assist function for the second power conversion circuit 42B.

Note that the first power conversion circuit 42A and the second power conversion circuit 42B may be power conversion circuits that supply three-phase currents to two different motors each of which generates steering assist force assisting steering of the steering wheel 1. For example, the two different motors may be connected to the same steering shaft 2 via a reduction gear.

On the source sides of the FETs Q2, Q4, and Q6 that form lower-side arms of the switching arms SWAa, SWAb, and SWAc in the first power conversion circuit 42A, current detection circuits 39A1, 39B1, and 39C1 are disposed, respectively. The current detection circuits 39A1, 39B1, and 39C1 detect downstream-side currents of the switching arms SWAa, SWAb, and SWAc as the A-phase current, the B-phase current, and the C-phase current of the first coils and output detected values I1ad, I1bd, and I1cd obtained in the detection, respectively.

On the source sides of the FETs Q2, Q4, and Q6 that form lower-side arms of the switching arms SWBa, SWBb, and SWBc in the second power conversion circuit 42B, current detection circuits 39A2, 39B2, and 39C2 are disposed, respectively. The current detection circuits 39A2, 39B2, and 39C2 detect downstream-side currents of the switching arms SWBa, SWBb, and SWBc as the A-phase current, the B-phase current, and the C-phase current of the second coils and output detected values I2ad, I2bd, and I2cd obtained in the detection, respectively.

The first motor current cut-off circuit 33A includes FETs QA1, QA2, and QA3 for current cut-off. A source of the FET QA1 is connected to the connection point between the FETs Q1 and Q2 of the switching arm SWAa in the first power conversion circuit 42A, and a drain of the FET QA1 is connected to the A-phase winding of the first coils in the motor 20. A source of the FET QA2 is connected to the connection point between the FETs Q3 and Q4 of the switching arm SWAb, and a drain of the FET QA2 is connected to the B-phase winding of the first coils. A source of the FET QA3 is connected to the connection point between the FETs Q5 and Q6 of the switching arm SWAc, and a drain of the FET QA3 is connected to the C-phase winding of the first coils.

The control calculation device 31 outputs a control signal SmA for controlling conduction and cut-off of the first motor current cut-off circuit 33A to the first gate drive circuit 41A. The first gate drive circuit 41A outputs gate signals for the FETs QA1 to QA3 according to the control signal SmA and thereby flows or cuts off the A-phase current I1a, the B-phase current I1b, and the C-phase current I1c from the first power conversion circuit 42A to the motor 20, respectively.

The second motor current cut-off circuit 33B includes FETs QB1, QB2, and QB3 for current cut-off. A source of the FET QB1 is connected to the connection point between the FETs Q1 and Q2 of the switching arm SWBa in the second power conversion circuit 42B, and a drain of the FET QB1 is connected to the A-phase winding of the second coils in the motor 20. A source of the FET QB2 is connected to the connection point between the FETs Q3 and Q4 of the switching arm SWBb, and a drain of the FET QB2 is connected to the B-phase winding of the second coils. A source of the FET QB3 is connected to the connection point between the FETs Q5 and Q6 of the switching arm SWBc, and a drain of the FET QB3 is connected to the C-phase winding of the second coils.

The control calculation device 31 outputs a control signal SmB for controlling conduction and cut-off of the second motor current cut-off circuit 33B to the second gate drive circuit 41B. The second gate drive circuit 41B outputs gate signals for the FETs QB1 to QB3 according to the control signal SmB and thereby flows or cuts off the A-phase current I2a, the B-phase current I2b, and the C-phase current I2c from the second power conversion circuit 42B to the motor 20, respectively.

The motor rotation angle detection circuit 23 acquires a detected value from the rotation angle sensor 23a and detects the motor rotation angle θm that is a rotation angle of the rotation shaft of the motor 20. The motor rotation angle detection circuit 23 outputs the motor rotation angle θm to the control calculation device 31.

The temperature detection circuit 45 includes a temperature sensor 45a that is arranged in a vicinity of the first power conversion circuit 42A and the second power conversion circuit 42B. The temperature sensor 45a is an example of a "temperature detection element". Note that an arrangement position of the temperature sensor 45a does not have to be in the vicinity of the first power conversion circuit 42A and the second power conversion circuit 42B. The temperature sensor 45a is only necessary to be arranged at a place likely to generate heat in the ECU 30.

The temperature detection circuit 45 detects temperature of the first power conversion circuit 42A and the second power conversion circuit 42B based on output of the temperature sensor 45a and outputs a detection signal Sd1 indicating a detection result. In the following description, the temperature of the first power conversion circuit 42A and the second power conversion circuit 42B that the temperature detection circuit 45 detects (temperature that the detection signal Sd1 indicates) is sometimes referred to as "ECU temperature detected value Te1".

For example, the temperature sensor 45a may be a thermistor. The temperature detection circuit 45 may include a thermistor processing circuit configured to detect the temperature of the first power conversion circuit 42A and the second power conversion circuit 42B according to a resistance value of the thermistor.

Figure 3:
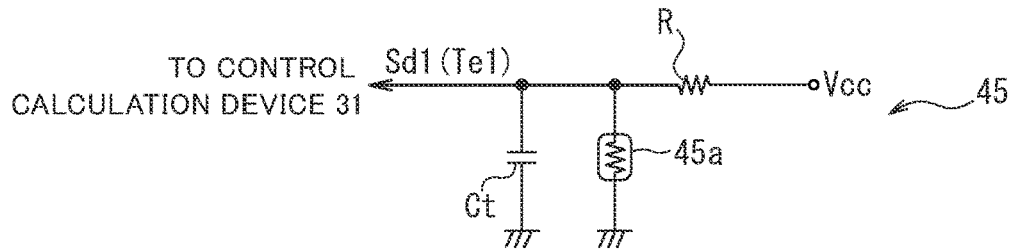
FIG. 3 is a circuit diagram of an example of a temperature detection circuit.

FIG. 3 is a circuit diagram of an example of the temperature detection circuit 45. The temperature detection circuit 45 includes a voltage divider circuit in which a thermistor serving as the temperature sensor 45a and a fixed resistor R are connected in series and a capacitor Ct. The voltage divider circuit formed by the thermistor 45a and the fixed resistor R voltage-divides predetermined voltage Vcc by a ratio of a resistance value of the thermistor 45a to a resistance value of the fixed resistor R and outputs a value obtained by the voltage division to the control calculation device 31 as the detection signal Sd1.

FIG. 2 is now referred to. The control calculation device 31 acquires, via an A/D conversion unit 31a, the detected values I1ad, I1bd, and I1cd of the A-phase current, the B-phase current, and the C-phase current of the first coils, the detected values I2ad, I2bd, and I2cd of the A-phase current, the B-phase current, and the C-phase current of the second coils, and the detection signal Sd1 of the temperature detection circuit 45.

The control calculation device 31 includes a temperature measurement unit 31b configured to measure ECU temperature that is temperature of the first power conversion circuit 42A and the second power conversion circuit 42B and also estimate motor temperature that is temperature of the motor 20 (for example, temperature of coil windings of the motor 20). The temperature measurement unit 31b measures the ECU temperature, based on the ECU temperature detected value Te1 that the detection signal Sd1 of the temperature detection circuit 45 indicates. In addition, the motor temperature measurement unit 31b estimates the motor temperature, based on the ECU temperature detected value Te1 and the detected values I1ad, I1bd, I1cd, I2ad, I2bd, and I2cd of motor currents flowing through the motor 20.

Figure 4:
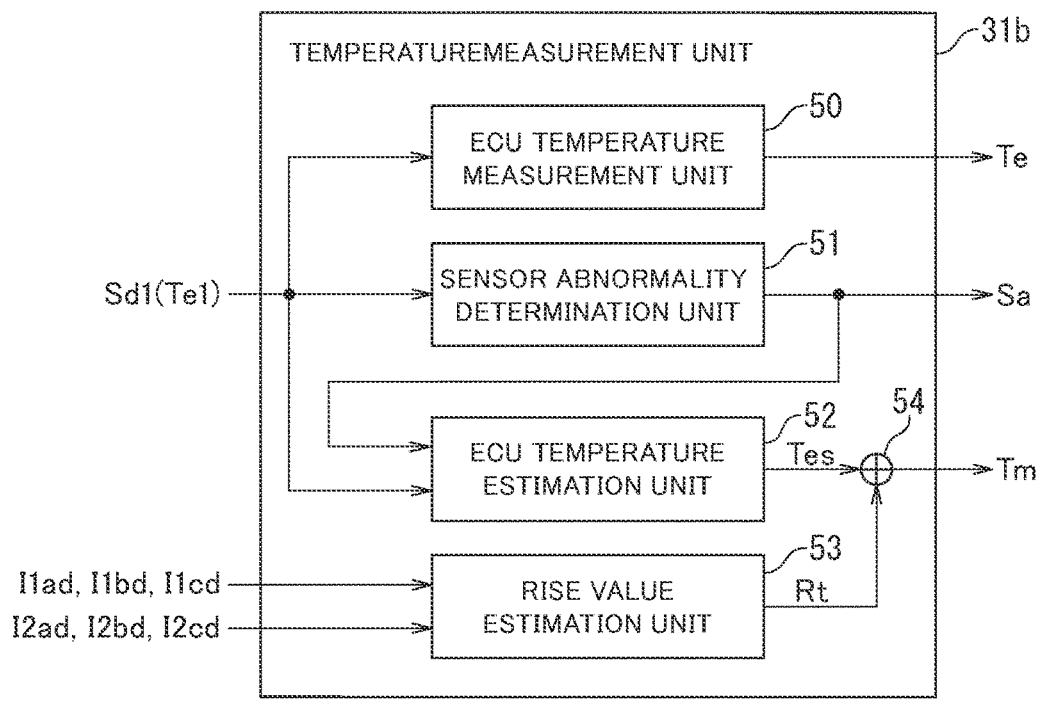
FIG. 4 is a block diagram of an example of a functional configuration of a temperature measurement unit of the first embodiment.

FIG. 4 is a block diagram of an example of a functional configuration of the temperature measurement unit 31b of the first embodiment. The temperature measurement unit 31b includes an ECU temperature measurement unit 50, a sensor abnormality determination unit 51, an ECU temperature estimation unit 52, a rise value estimation unit 53, and an adder 54.

The ECU temperature measurement unit 50 measures ECU temperature Te that is the temperature of the first power conversion circuit 42A and the second power conversion circuit 42B, based on the ECU temperature detected value Te1.

The sensor abnormality determination unit 51 determines whether or not the temperature detection circuit 45 is abnormal. The sensor abnormality determination unit 51 outputs an abnormality determination signal Sa indicating a determination result.

The ECU 30 of the first embodiment includes a single temperature detection circuit (the temperature detection circuit 45). In the following description relating to the first embodiment, the temperature detection circuit 45 being abnormal is referred to as "the temperature detection circuit is abnormal", and the temperature detection circuit 45 not being abnormal is referred to as "the temperature detection circuit is not abnormal".

On the other hand, ECUs 30 of a second embodiment and a third embodiment, which will be described later, include a plurality of temperature detection circuits (a first temperature detection circuit 45 and a second temperature detection circuit 46). In the descriptions relating to the second embodiment and the third embodiment, which will be described later, at least one of the first temperature detection circuit 45 and the second temperature detection circuit 46 being abnormal is referred to as "a temperature detection circuit is abnormal", and neither the first temperature detection circuit 45 nor the second temperature detection circuit 46 being abnormal (that is, both the first temperature detection circuit 45 and the second temperature detection circuit 46 being normal) is referred to as "the temperature detection circuit is not abnormal".

The sensor abnormality determination unit 51 may determine that the temperature detection circuit is abnormal when the detection signal Sd1 from the temperature detection circuit 45 has a value outside a predetermined range and determine that the temperature detection circuit is not abnormal (is normal) when the detection signal Sd1 has a value within the predetermined range.

For example, in the case of the temperature detection circuit 45 illustrated in FIG. 3, since, when disconnection occurs in the thermistor 45a due to an abnormality, the detection signal Sd1 rises to a value higher than an upper limit of the predetermined range, the abnormality in the temperature detection circuit 45 can be detected. In addition, since, when short-circuit occurs in the thermistor 45a due to an abnormality, the detection signal Sd1 falls to a value lower than a lower limit of the predetermined range, the abnormality in the temperature detection circuit 45 can be detected.

For example, even when the detection signal Sd1 has a value outside the predetermined range, the sensor abnormality determination unit 51 may determine that the temperature detection circuit is not abnormal until a state in which the detection signal Sd1 has a value outside the predetermined range continues for a predetermined time length TL. When the state in which the detection signal Sd1 has a value outside the predetermined range continues for the predetermined time length TL or longer, the sensor abnormality determination unit 51 may determine that the temperature detection circuit is abnormal. The predetermined time length TL may be, for example, 1 second. Because of this configuration, it is possible to prevent an abnormality in the temperature detection circuit 45 from being erroneously detected based on temporary fluctuation in the detection signal Sd1 due to influence of, for example, noise.

Note that when the sensor abnormality determination unit 51 detects an abnormality in the temperature detection circuit, a state in which the sensor abnormality determination unit 51 detects the abnormality in the temperature detection circuit is maintained until the ignition switch 11 switches to an off state. When the ignition switch 11 switches to the off state, the sensor abnormality determination unit 51 is reset to a normal state.

The ECU temperature estimation unit 52 estimates temperature of the first power conversion circuit 42A and the second power conversion circuit 42B, based on the ECU temperature detected value Te1 that the detection signal Sd1 from the temperature detection circuit 45 indicates and the abnormality determination signal Sa that is output from the sensor abnormality determination unit 51.

Hereinafter, the temperature of the first power conversion circuit 42A and the second power conversion circuit 42B that the ECU temperature estimation unit 52 estimates is sometimes referred to as "ECU temperature estimated value Tes". The ECU temperature estimation unit 52 is an example of a "first temperature estimation unit", and the ECU temperature estimated value Tes is an example of a "first temperature estimated value".

When the sensor abnormality determination unit 51 determines that the temperature detection circuit is not abnormal, the ECU temperature estimation unit 52 may output the ECU temperature detected value Te1 that the detection signal Sd1 indicates as the ECU temperature estimated value Tes.

When the sensor abnormality determination unit 51 determines that the temperature detection circuit is abnormal, the ECU temperature estimation unit 52 outputs a value that gradually increases from the ECU temperature detected value Te1 that the temperature detection circuit 45 detected before the temperature detection circuit is determined to be abnormal to a predetermined set value Ts at a constant increase rate $\Delta Tr$ [° C./sec] as the ECU temperature estimated value Tes.

For example, when the detection signal Sd1 from the temperature detection circuit 45 has a value within the predetermined range, the ECU temperature estimation unit 52 may temporarily hold the ECU temperature detected value Te1 that the temperature detection circuit 45 detected as a hold value Thd and successively update the hold value Thd.

At a time point t1 at which the detection signal Sd1 from the temperature detection circuit 45 comes to have a value outside the predetermined range, the ECU temperature estimation unit 52 stops the update of the hold value Thd. While a state in which the detection signal Sd1 has a value outside the predetermined range continues, the ECU temperature estimation unit 52 outputs the hold value Thd that the ECU temperature estimation unit 52 held immediately before the time point t1 as the ECU temperature estimated value Tes until the predetermined time length TL elapses.

That is, the ECU temperature estimation unit 52 holds the ECU temperature detected value Te1 immediately before the output signal from the temperature detection element comes to have a value outside the predetermined range as the hold value Thd and, while a state in which the detection signal Sd1 has a value outside the predetermined range continues, outputs the hold value Thd as the ECU temperature estimated value Tes until the predetermined time length TL elapses.

When the state in which the detection signal Sd1 has a value outside the predetermined range continues even when the time has passed a time point t2 that is the predetermined time length TL later than the time point t1, the ECU temperature estimation unit 52 outputs, at the time point t2, a value that gradually increases from the hold value Thd that the ECU temperature estimation unit 52 held immediately before the time point t1 to the predetermined set value Ts at the constant increase rate ΔTr [° C./sec] as the ECU temperature estimated value Tes.

When the value of the detection signal Sd1 returns to a value within the predetermined range before the time point t2, the ECU temperature estimation unit 52 outputs the ECU temperature detected value Te1 that the detection signal Sd1 received from the temperature detection circuit 45 indicates as the ECU temperature estimated value Tes. In addition, the ECU temperature estimation unit 52 resumes the update of the hold value Thd.

Figure 5:
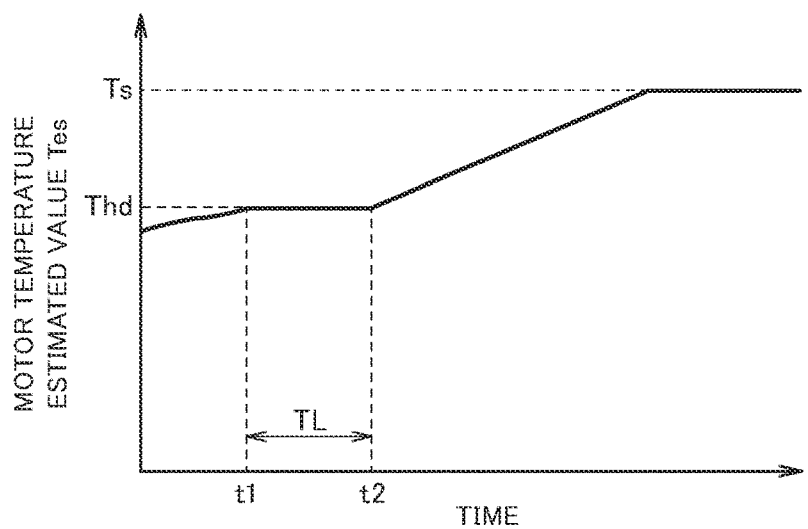
FIG. 5 is an explanatory diagram schematically illustrative of change in ECU temperature estimated value when the temperature detection circuit is abnormal.

FIG. 5 is an explanatory diagram schematically illustrative of change in the ECU temperature estimated value Tes when the temperature detection circuit is abnormal.

In a period before the time point t1, the detection signal Sd1 from the temperature detection circuit 45 has a value within the predetermined range, and the ECU temperature estimation unit 52 thus outputs the ECU temperature detected value Te1 that the detection signal Sd1 indicates as the ECU temperature estimated value Tes. In addition, the ECU temperature estimation unit 52 temporarily holds the ECU temperature detected value Te1 that the temperature detection circuit 45 detected as a hold value Thd and successively updates the hold value Thd.

When the detection signal Sd1 from the temperature detection circuit 45 comes to have a value outside the predetermined range at the time point t1, the ECU temperature estimation unit 52 stops the update of the hold value Thd (that is, holds the hold value Thd immediately before the detection signal Sd1 comes to have a value outside the predetermined range) and outputs the hold value Thd as the ECU temperature estimated value Tes.

When the state in which the detection signal Sd1 has a value outside the predetermined range continues even when the time has passed the time point t2 that is the predetermined time length TL later than the time point t1, the ECU temperature estimation unit 52 outputs, at the time point t2, a value that gradually increases from the hold value Thd to the predetermined set value Ts at the constant increase rate ΔTr [° C./sec] as the ECU temperature estimated value Tes.

FIG. 4 is now referred to. The rise value estimation unit 53 estimates a rise value Rt of motor temperature due to motor currents flowing through the motor 20. For example, the rise value estimation unit 53 may estimate the rise value Rt by subtracting the amount of heat dissipation of the motor 20 from an integral value of a square sum of the detected values I1ad, I1bd, I1cd, I2ad, I2bd, and I2cd of the motor currents. The adder 54 calculates a value obtained by adding the rise value Rt to the ECU temperature estimated value Tes as a motor temperature estimated value Tm. The adder 54 is an example of a "second temperature estimation unit" described in the claims, and the motor temperature estimated value Tm is an example of a "second temperature estimated value" described in the claims.

FIG. 2 is now referred to. When the ECU temperature Te exceeds a threshold value or the motor temperature estimated value Tm exceeds a threshold value, the control calculation device 31 limits motor currents to be flowed through the motor 20.

Figure 6:
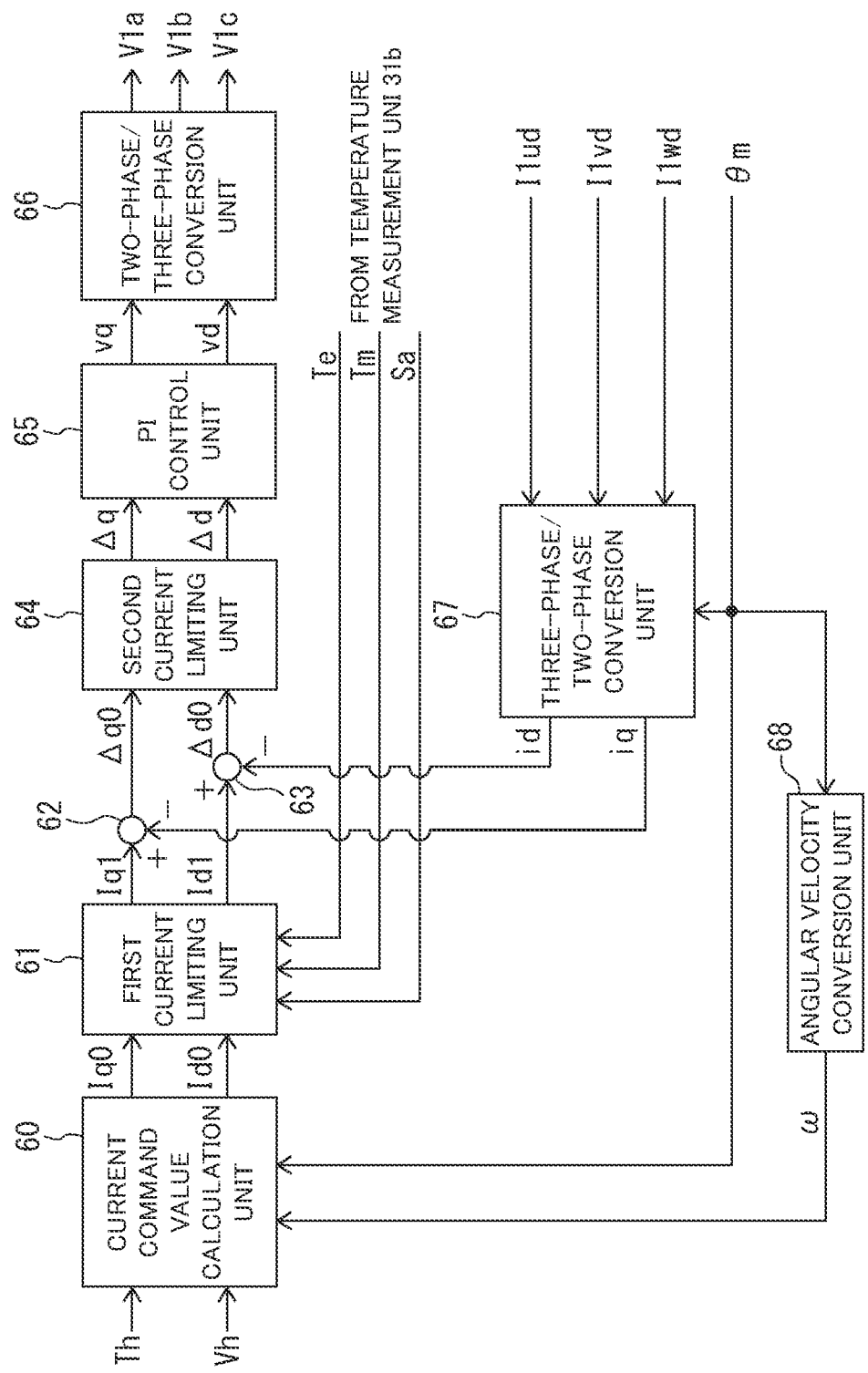
FIG. 6 is a block diagram of an example of a functional configuration of a control calculation device of the first embodiment.

FIG. 6 is a block diagram of an example of a functional configuration of the control calculation device 31 of the first embodiment. Note that although, in FIG. 6, only a functional configuration to drive the first coils of the motor 20 is described, a functional configuration to drive the second coils also has the same configuration.

The control calculation device 31 includes a current command value calculation unit 60, a first current limiting unit 61, subtracters 62 and 63, a second current limiting unit 64, a proportional-integral (PI) control unit 65, a two-phase/three-phase conversion unit 66, a three-phase/two-phase conversion unit 67, and an angular velocity conversion unit 68 and drives the motor 20 by vector control.

The current command value calculation unit 60 calculates a q-axis current command value Iq0 and a d-axis current command value Id0 that are to be flowed through the motor 20, based on the steering torque Th, the vehicle speed Vh, the motor rotation angle θm of the motor 20, and rotational angular velocity ω of the motor 20.

The first current limiting unit 61, by limiting the q-axis current command value Iq0 and the d-axis current command value Id0 based on the abnormality determination signal Sa, the ECU temperature Te, and the motor temperature estimated value Tm output from the temperature measurement unit 31b, calculates a q-axis current command value Iq1 and a d-axis current command value Id1 after limitation.

For example, when the ECU temperature Te exceeds a predetermined first threshold value Ta1, the first current limiting unit 61 may, by limiting the q-axis current command value Iq0 and the d-axis current command value Id0 in such a manner that the higher the ECU temperature Te becomes, the more largely the q-axis current command value Iq0 and the d-axis current command value Id0 are limited, calculate the q-axis current command value Iq1 and the d-axis current command value Id1. That is, the first current limiting unit 61 may calculate the q-axis current command value Iq1 and the d-axis current command value Id1 that gradually decrease as the ECU temperature Te becomes higher.

In addition, for example, when the motor temperature estimated value Tm exceeds a second threshold value Tb1, the first current limiting unit 61 may, by limiting the q-axis current command value Iq0 and the d-axis current command value Id0 in such a manner that the higher the motor temperature estimated value Tm becomes, the more largely the q-axis current command value Iq0 and the d-axis current command value Id0 are limited, calculate the q-axis current command value Iq1 and the d-axis current command value Id1. That is, the first current limiting unit 61 may calculate the q-axis current command value Iq1 and the d-axis current command value Id1 that gradually decrease as the motor temperature estimated value Tm becomes higher.

In addition, for example, when the sensor abnormality determination unit 51 determines that the temperature detection circuit is abnormal, the first current limiting unit 61 may calculate the q-axis current command value Iq1 and the d-axis current command value Id1 having smaller values than the q-axis current command value Iq0 and the d-axis current command value Id0, respectively. For example, the first current limiting unit 61 may, by limiting the q-axis current command value Iq0 and the d-axis current command value Id0 to 50%, calculate the q-axis current command value Iq1 and the d-axis current command value Id1.

For example, the first current limiting unit 61 may set a limiting gain K1 depending on the abnormality determination signal Sa, a limiting gain K2 depending on the ECU temperature Te, and a limiting gain K3 depending on the motor temperature estimated value Tm.

The first current limiting unit 61 may set a value of the limiting gain K1 to "1" when the sensor abnormality determination unit 51 determines that the temperature detection circuit is not abnormal and set the limiting gain K1 to "0.5" when the sensor abnormality determination unit 51 determines that the temperature detection circuit is abnormal.

When the sensor abnormality determination unit 51 determines that the temperature detection circuit is not abnormal and the ECU temperature Te exceeds the first threshold value Ta1, the first current limiting unit 61 may gradually decrease a value of the limiting gain K2 from "1" to "0" according to rise of the ECU temperature Te from the first threshold value Ta1 to a third threshold value Ta2. The value of the limiting gain K2 may be gradually decreased linearly from "1" to "0" according to rise of the ECU temperature Te from the first threshold value Ta1 to the third threshold value Ta2.

When the sensor abnormality determination unit 51 determines that the temperature detection circuit is abnormal, the first current limiting unit 61 may set the value of the limiting gain K2 to "1".

The first current limiting unit 61 may provide the limiting gain K2 with hysteresis characteristics. For example, when the ECU temperature Te exceeds the first threshold value Ta1 while the value of the limiting gain K2 is set to "1", the first current limiting unit 61 gradually decreases the value of the limiting gain K2 from "1" according to rise of the ECU temperature Te from the first threshold value Ta1. Unless the ECU temperature Te reaches the third threshold value Ta2 (that is, unless the value of the limiting gain K2 becomes "0"), the first current limiting unit 61 decreases or increases the value of the limiting gain K2 within a range from "1" to "0" according to rise or fall of the ECU temperature Te within a range from the first threshold value Ta1 to the third threshold value Ta2.

When the ECU temperature Te reaches the third threshold value Ta2 (that is, when the value of the limiting gain K2 becomes "0"), the first current limiting unit 61 does not increase the value of the limiting gain K2 from "0" even when the ECU temperature Te becomes less than the third threshold value Ta2. When the ECU temperature Te decreases to a value less than a fourth threshold value Ta3 that is smaller than the third threshold value Ta2, the first current limiting unit 61 may start to increase the limiting gain K2 and gradually increase the value of the limiting gain K2 from "0" to "1" according to fall of the ECU temperature Te to a fifth threshold value Ta4 that is smaller than the first threshold value Ta1. For example, the fourth threshold value Ta3 may be set to a value lower than the first threshold value Ta1 or may be set to a value higher than the first threshold value Ta1.

Unless the ECU temperature Te reaches the fifth threshold value Ta4 (that is, unless the value of the limiting gain K2 becomes "1"), the first current limiting unit 61 decreases or increases the value of the limiting gain K2 within a range from "0" to "1" according to rise or fall of the ECU temperature Te within a range from the fourth threshold value Ta3 to the fifth threshold value Ta4.

When the motor temperature estimated value Tm exceeds the second threshold value Tb1, the first current limiting unit 61 may gradually decrease a value of the limiting gain K3 from "1" to "0" according to rise of the motor temperature estimated value Tm from the second threshold value Tb1 to a sixth threshold value Tb2. For example, the value of the limiting gain K3 may be gradually decreased linearly from "1" to "0" according to rise of the motor temperature estimated value Tm from the second threshold value Tb1 to the sixth threshold value Tb2.

In addition, the limiting gain K3 may be provided with hysteresis characteristics similar to the above-described hysteresis characteristics of the limiting gain K2.

The first current limiting unit 61, by limiting the q-axis current command value Iq0 and the d-axis current command value Id0 based on the limiting gains K1, K2, and K3, calculates the q-axis current command value Iq1 and the d-axis current command value Id1.

For example, when the sensor abnormality determination unit 51 determines that the temperature detection circuit is not abnormal (that is, when the limiting gain K1 is equal to "1"), the first current limiting unit 61 may select a gain K4=min(K2, K3) that is either K2 or K3 that is smaller than the other and calculate products obtained by multiplying the q-axis current command value Iq0 and the d-axis current command value Id0 by the gain K4 as the q-axis current command value Iq1=K4×Iq0 and the d-axis current command value Id1=K4×Id0.

In addition, for example, the first current limiting unit 61 may calculate products obtained by multiplying the q-axis current command value Iq0 and the d-axis current command value Id0 by the gains K2 and K3 as the q-axis current command value Iq1=K2×K3×Iq0 and the d-axis current command value Id1=K2× K3×Id0.

For example, when the sensor abnormality determination unit 51 determines that the temperature detection circuit is abnormal (that is, when the limiting gain K1 is equal to "0.5"), the first current limiting unit 61 may calculate products obtained by multiplying the q-axis current command value Iq0 and the d-axis current command value Id0 by the limiting gains K1 and K3 as the q-axis current command value Iq1=K1×K3×Iq0 and the d-axis current command value Id1=K1×K3×Id0.

On the other hand, the detected values I1ad, I1bd, and I1cd of the A-phase current, the B-phase current, and the C-phase current flowing through the first coils of the motor 20 that are detected by the current detection circuits 39A1, 39B1, and 39C1, respectively are converted to currents id and iq in two axes, namely the d-axis and the q-axis, by the three-phase/two-phase conversion unit 67.

The subtracters 62 and 63, by subtracting the fed-back currents iq and id from the q-axis current command value Iq1 and the d-axis current command value Id1 after limitation, calculates q-axis deviation current Δq0 and d-axis deviation current Δd0, respectively.

The second current limiting unit 64 limits upper limits of the q-axis deviation current Δq0 and the d-axis deviation current Δd0. The q-axis deviation current Δq0 and the d-axis deviation current Δd0 after limitation are input to the PI control unit 65.

The PI control unit 65 calculates voltage command values vq and vd that bring the q-axis deviation current Δq0 and the d-axis deviation current Δd0 to 0, respectively. The two-phase/three-phase conversion unit 66 converts the voltage command values vd and vq to the A-phase voltage control command value V1a, the B-phase voltage command value V1b, and the C-phase voltage command value Vic for the first coils of the motor 20 and outputs the A-phase voltage control command value V1a, the B-phase voltage command value V1b, and the C-phase voltage command value Vic to the first gate drive circuit 41A.

The angular velocity conversion unit 68 calculates the rotational angular velocity ω of the motor 20, based on temporal change in the motor rotation angle θm. The motor rotation angle θm and the rotational angular velocity ω are input to the current command value calculation unit 60 and are used for the vector control.

Figure 7:
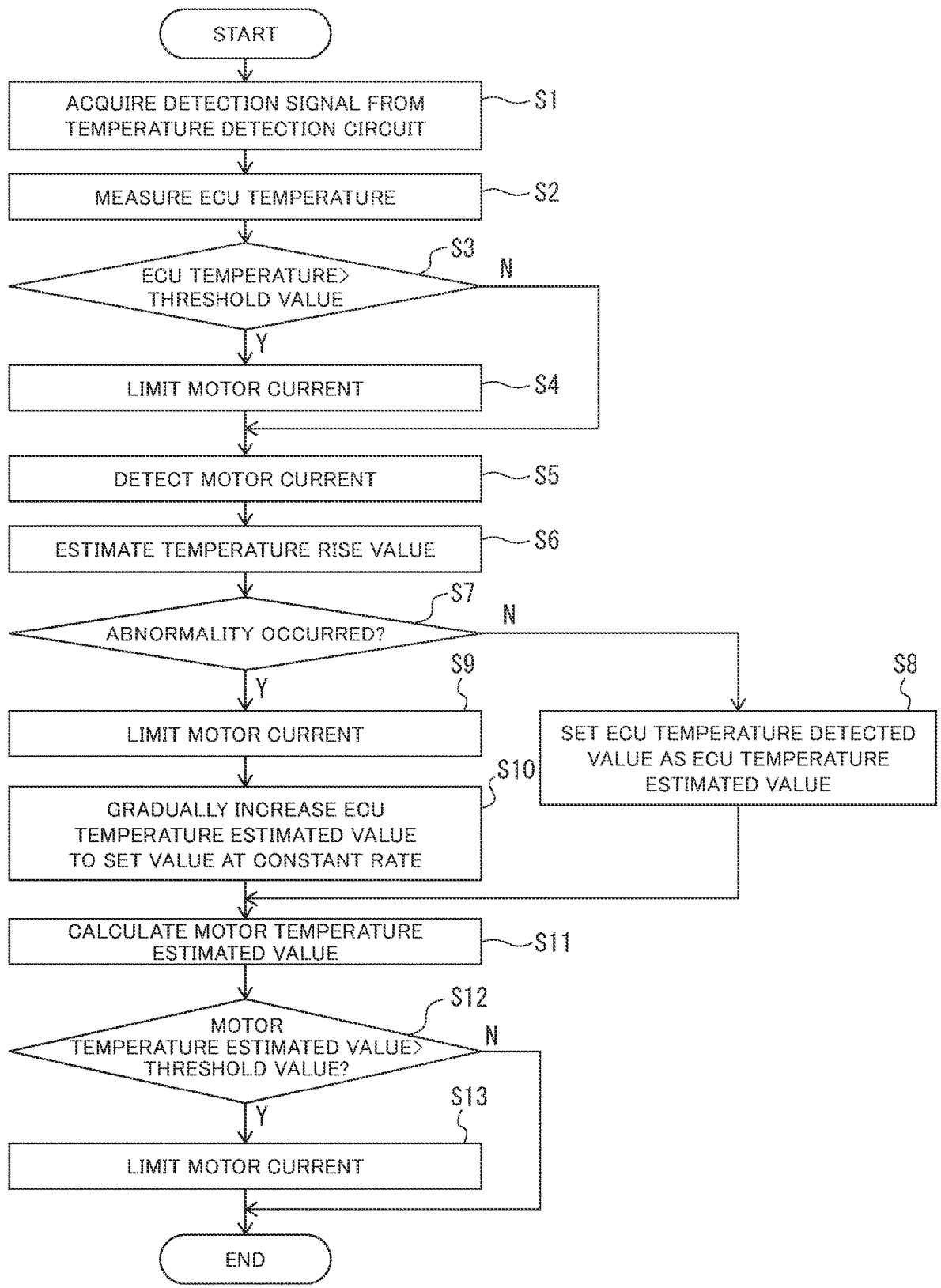
FIG. 7 is a flowchart of an example of a motor control method of the first embodiment.

FIG. 7 is a flowchart of an example of a motor control method of the first embodiment.

In step S1, the ECU temperature measurement unit 50, the sensor abnormality determination unit 51, and the ECU temperature estimation unit 52 acquire the detection signal Sd1 from the temperature detection circuit 45.

In step S2, the ECU temperature measurement unit 50 measures the ECU temperature Te, based on the ECU temperature detected value Te1.

In step S3, the first current limiting unit 61 determines whether or not the ECU temperature Te exceeds the first threshold value Ta1. When the ECU temperature Te has exceeded the first threshold value Ta1 (step S3: Y), the process proceeds to step S4. When the ECU temperature Te has not exceeded the first threshold value Ta1 (step S3: N), the process proceeds to step S5.

In step S4, the first current limiting unit 61 limits the q-axis current command value Iq0 and the d-axis current command value Id0. Subsequently, the process proceeds to step S5.

In step S5, the current detection circuits 39A1, 39B1, 39C1, 39A2, 39B2, and 39C2 detect the motor currents I1ad, I1bd, I1cd, I2ad, I2bd, and I2cd, respectively.

In step S6, the rise value estimation unit 53 estimates a rise value Rt of motor temperature due to motor currents, based on the motor currents I1ad, I1bd, I1cd, I2ad, I2bd, and I2cd.

In step S7, the sensor abnormality determination unit 51 determines whether or not the temperature detection circuit is abnormal. When the temperature detection circuit is abnormal (step S7: Y), the process proceeds to step S9. When the temperature detection circuit is not abnormal (step S7: N), the process proceeds to step S8.

In step S8, the ECU temperature estimation unit 52 sets the ECU temperature detected value Te1 as the ECU temperature estimated value Tes. Subsequently, the process proceeds to step S11.

In step S9, the first current limiting unit 61 limits the q-axis current command value Iq0 and the d-axis current command value Id0. In step S10, the ECU temperature estimation unit 52 gradually increases the ECU temperature estimated value Tes to the predetermined set value Ts at the constant increase rate ΔTr. For example, the ECU temperature estimation unit 52 increases the ECU temperature estimated value Tes by a predetermined step amount per unit time. Subsequently, the process proceeds to step S11.

In step S11, the adder 54 calculates a value obtained by adding the rise value Rt to the ECU temperature estimated value Tes as the motor temperature estimated value Tm.

In step S12, the first current limiting unit 61 determines whether or not the motor temperature estimated value Tm has exceeded the second threshold value Tb1.

When the motor temperature estimated value Tm has exceeded the second threshold value Tb1 (step S12: Y), the process proceeds to step S13. When the motor temperature estimated value Tm has not exceeded the second threshold value Tb1 (step S12: N), the process terminates.

In step S13, the first current limiting unit 61 limits the q-axis current command value Iq0 and the d-axis current command value Id0. Subsequently, the process terminates.

Advantageous Effects of First Embodiment (1) The ECU 30 includes the first power conversion circuit 42A and the second power conversion circuit 42B configured to control motor currents flowing through the motor 20, the temperature detection circuit 45 including the temperature sensor 45a arranged in a vicinity of the first power conversion circuit 42A and the second power conversion circuit 42B, the rise value estimation unit 53 configured to estimate the rise value Rt of the temperature of the motor 20 due to the motor currents, the sensor abnormality determination unit 51 configured to determine whether or not the temperature detection circuit 45 is abnormal, the ECU temperature estimation unit 52 configured to, when the temperature detection circuit 45 is determined to be normal, output detected temperature detected by the temperature detection circuit 45 as the ECU temperature estimated value Tes and, when the temperature detection circuit 45 is determined to be abnormal, output a value gradually increasing from a detected temperature detected by the temperature detection circuit 45 to the predetermined set value Ts at a constant increase rate as the ECU temperature estimated value Tes, the adder 54 configured to calculate a value obtained by adding the rise value Rt to the ECU temperature estimated value Tes as the motor temperature estimated value Tm, and the first current limiting unit 61 configured to, when the motor temperature estimated value Tm exceeds a predetermined threshold value, limit the motor currents in such a way that the motor currents gradually decrease as the motor temperature estimated value Tm becomes higher.

The sensor abnormality determination unit 51 determines that the temperature detection circuit 45 is normal when an output signal from the temperature detection circuit 45 has a value within a predetermined range and determines that the temperature detection circuit 45 is abnormal when the output signal from the temperature sensor 45a has a value outside the predetermined range.

Because of this configuration, it is possible to prevent the motor temperature estimated value Tm from rapidly increasing and the motor currents from being excessively limited when an abnormality occurs in the temperature detection circuit 45. In addition, by limiting the motor currents in such a way that the motor currents gradually decrease even when the motor temperature estimated value Tm exceeds a predetermined threshold value, it is possible to suppress the increase of the motor temperature estimated value Tm and to prevent limitation of the motor currents from becoming excessive.

(2) The ECU temperature estimation unit 52 may hold detected temperature that the temperature detection circuit 45 detected as a hold value and, when the temperature detection circuit 45 is determined to be abnormal, output a value that gradually increases as time elapses from the hold value that was held before the temperature detection circuit 45 is determined to be abnormal to the predetermined set value Ts at a constant increase rate as the ECU temperature estimated value Tes.

Because of this configuration, when an abnormality occurs in the temperature detection circuit 45, it is possible to prevent the ECU temperature estimated value Tes from being calculated based on an abnormal detected value.

(3) When a state in which an output signal from the temperature detection element has a value outside the predetermined range continues for a predetermined time length or more, the sensor abnormality determination unit 51 may determine that the temperature detection circuit is abnormal. The ECU temperature estimation unit 52 may hold detected temperature that the temperature detection circuit 45 detected as a hold value and output a value that gradually increases as time elapses from the hold value immediately before the output signal from the temperature detection circuit 45 becomes a value outside the predetermined range to a predetermined set value at a constant increase rate as the ECU temperature estimated value Tes.

Because of this configuration, it is possible to prevent an abnormality in the temperature detection circuit 45 from being erroneously detected based on temporary fluctuation in the output signal from the temperature sensor 45a due to influence of noise or the like.

(4) The electric power steering device includes the ECU 30 and the motor 20 controlled by the ECU 30 and provides a steering system of a vehicle with steering assist force by the motor 20. The electric power steering device includes the torque sensor 10 configured to detect steering torque of the steering wheel 1, and the ECU 30 includes the current command value calculation unit 60 configured to set current command values of motor currents flowing through the motor 20 at least based on the steering torque. Current control supplying each motor current flowing through the electric motor may be made redundant by the first power conversion circuit 42A and the second power conversion circuit 42B. The first current limiting unit 61 may limit motor currents flowing through the motor 20 when the temperature detection circuit is determined to be abnormal to current having a smaller value than a current command value. This configuration enables the motor currents to be limited in such a way that temperature of the motor current control circuit is less than or equal to an allowable temperature in the electric power steering device.

Second Embodiment

In an ECU 30 of a second embodiment, a temperature detection circuit configured to detect temperature of a first power conversion circuit 42A and a second power conversion circuit 42B is made redundant.

Figure 8:
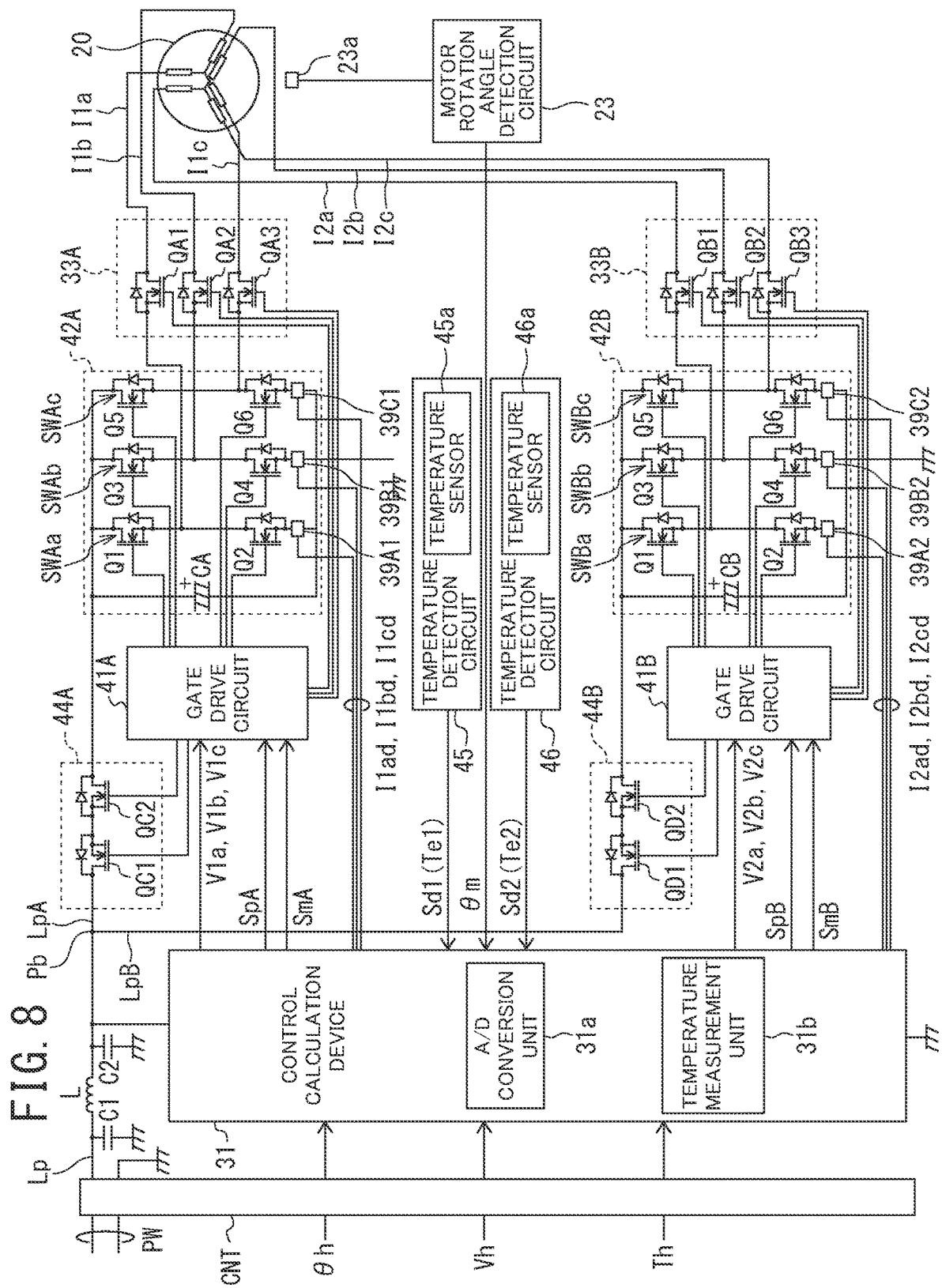
FIG. 8 is a configuration diagram illustrative of an outline of an example of an electronic control unit of a second embodiment and a third embodiment.

FIG. 8 is a configuration diagram illustrative of an outline of an example of the ECU 30 of the second embodiment. The ECU 30 of the second embodiment includes a first temperature detection circuits 45 serving as the temperature detection circuit 45 of the first embodiment and a second temperature detection circuit 46. The other constituent elements of the ECU 30 of the second embodiment are the same as those in the first embodiment.

Note that description of constituent elements and functions common to the ECU 30 of the first embodiment will be omitted. In addition, in the following description, a temperature sensor 45a of the first temperature detection circuit 45 is referred to as "first temperature sensor 45a".

The second temperature detection circuit 46 includes a second temperature sensor 46a that is arranged in a vicinity of the first power conversion circuit 42A and the second power conversion circuit 42B. The first temperature sensor 45a and the second temperature sensor 46a are examples of a "first temperature detection element" and a "second temperature detection element", respectively. Note that an arrangement position of the second temperature sensor 46a does not have to be in the vicinity of the first power conversion circuit 42A and the second power conversion circuit 42B. The second temperature sensor 46a is only necessary to be arranged at a place likely to generate heat in the ECU 30.

The second temperature detection circuit 46 detects temperature of the first power conversion circuit 42A and the second power conversion circuit 42B based on output of the second temperature sensor 46a and outputs a detection signal Sd2 indicating a detection result. In the following description, the temperature of the first power conversion circuit 42A and the second power conversion circuit 42B that the second temperature detection circuit 46 detects (temperature that the detection signal Sd2 indicates) is sometimes referred to as "ECU temperature detected value Te2".

The second temperature detection circuit 46 may have the same configuration as the configuration of the first temperature detection circuit 45. For example, the second temperature sensor 46a of the second temperature detection circuit 46 may be a thermistor that has the same characteristics as the characteristics of the first temperature sensor 45a of the first temperature detection circuit 45, and fixed resistors R of the first temperature detection circuit 45 and the second temperature detection circuit 46 may have the same resistance value.

A control calculation device 31 acquires the detection signal Sd2 from the second temperature detection circuit 46 via an A/D conversion unit 31a. A temperature measurement unit 31b estimates motor temperature, based on ECU temperature detected values Te1 and Te2 that the detection signals Sd1 and Sd2 from the first temperature detection circuit 45 and the second temperature detection circuit 46 indicate, respectively and detected values I1ad, I1bd, I1cd, I2ad, I2bd, and I2cd of motor currents flowing through the motor 20.

Figure 9:
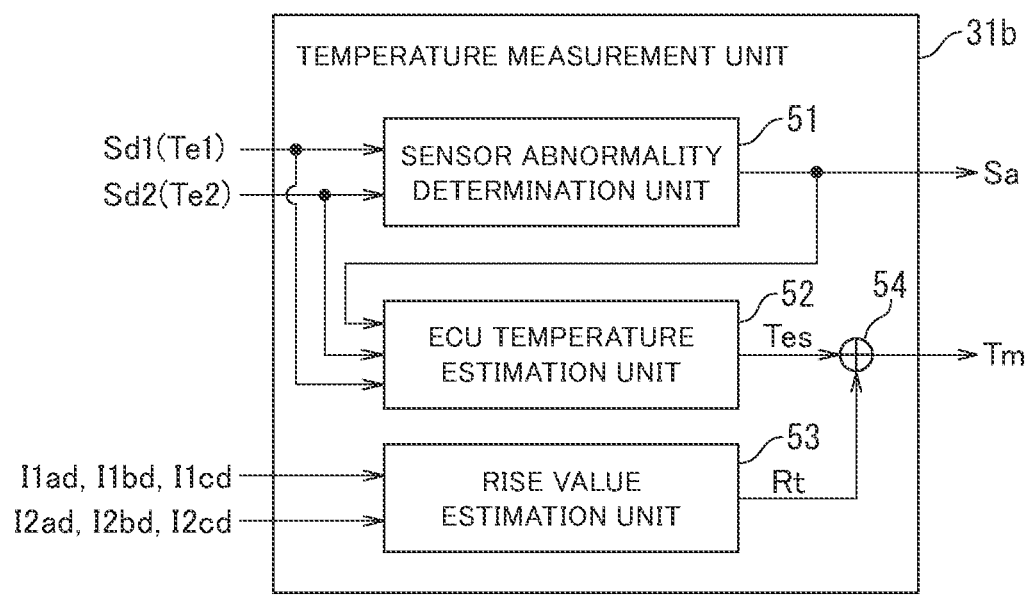
FIG. 9 is a block diagram of an example of a functional configuration of a temperature measurement unit of the second embodiment.

FIG. 9 is a block diagram of an example of a functional configuration of the temperature measurement unit 31b of the second embodiment. The temperature measurement unit 31b includes a sensor abnormality determination unit 51, an ECU temperature estimation unit 52, a rise value estimation unit 53, and an adder 54. Note that description of constituent elements and functions common to the temperature measurement unit 31b of the first embodiment illustrated in FIG. 4 will be omitted.

The sensor abnormality determination unit 51 determines whether or not at least one of the first temperature detection circuit 45 and the second temperature detection circuit 46 is abnormal and outputs an abnormality determination signal Sa indicating a determination result.

In the descriptions relating to the second embodiment and the third embodiment, at least one of the first temperature detection circuit 45 and the second temperature detection circuit 46 being abnormal is referred to as "a temperature detection circuit is abnormal", and neither the first temperature detection circuit 45 nor the second temperature detection circuit 46 being abnormal (that is, both the first temperature detection circuit 45 and the second temperature detection circuit 46 being normal) is referred to as "the temperature detection circuit is not abnormal".

For example, the sensor abnormality determination unit 51 may determine that a temperature detection circuit is abnormal when a difference ΔTe between the ECU temperature detected value Te1 that the detection signal Sd1 from the first temperature detection circuit 45 indicates and the ECU temperature detected value Te2 that the detection signal Sd2 from the second temperature detection circuit 46 indicates is greater than or equal to a predetermined value ΔTt. When the difference ΔTe is less than the predetermined value ΔTt, the sensor abnormality determination unit 51 may determine that the temperature detection circuit is not abnormal.

For example, the predetermined value ΔTt may be 5° C. Because of this configuration, it is possible to prevent an abnormality in the first temperature detection circuit 45 and the second temperature detection circuit 46 from being erroneously detected even when, for example, there is some degree of error between the ECU temperature detected value Te1 and the ECU temperature detected value Te2 due to variation of components constituting the first temperature detection circuit 45 and the second temperature detection circuit 46.

In addition, for example, even when the difference ΔTe becomes greater than or equal to the predetermined value ΔTt, the sensor abnormality determination unit 51 may determine that the temperature detection circuit is not abnormal until a state in which the difference ΔTe is greater than or equal to the predetermined value ΔTt continues for a predetermined time length TL. When the state in which the difference ΔTe is greater than or equal to the predetermined value ΔTt continues for the predetermined time length TL or longer, the sensor abnormality determination unit 51 may determine that a temperature detection circuit is abnormal. For example, the predetermined time length TL may be 1 second. Because of this configuration, it is possible to prevent an abnormality in the temperature detection circuit 45 and the second temperature detection circuit 46 from being erroneously detected based on a temporary increase in the difference ΔTe due to influence of, for example, noise.

The ECU temperature estimation unit 52 estimates temperature of the first power conversion circuit 42A and the second power conversion circuit 42B, based on the ECU temperature detected value Te1 that the detection signal Sd1 from the first temperature detection circuit 45 indicates, the ECU temperature detected value Te2 that the detection signal Sd2 from the second temperature detection circuit 46 indicates, and the abnormality determination signal Sa that is output from the sensor abnormality determination unit 51.

When the sensor abnormality determination unit 51 determines that the temperature detection circuit is not abnormal, the ECU temperature estimation unit 52 may select one of the ECU temperature detected value Te1 and the ECU temperature detected value Te2 and output the selected one as an ECU temperature estimated value Tes. For example, the ECU temperature estimation unit 52 may output a higher detected value between the ECU temperature detected value Te1 and the ECU temperature detected value Te2 as the ECU temperature estimated value Tes or output a lower detected value as the ECU temperature estimated value Tes.

When the sensor abnormality determination unit 51 determines that a temperature detection circuit is abnormal, the ECU temperature estimation unit 52 outputs a value that gradually increases from the ECU temperature detected value Te1 that the first temperature detection circuit 45 detected or the ECU temperature detected value Te2 that the second temperature detection circuit 46 detected to a predetermined set value Ts at a constant increase rate ΔTr [° C./sec] as the ECU temperature estimated value Tes.

For example, when the ECU temperature estimation unit 52 has output the ECU temperature detected value Te1 as the ECU temperature estimated value Tes until immediately before the sensor abnormality determination unit 51 determines that a temperature detection circuit is abnormal, the ECU temperature estimation unit 52 outputs the ECU temperature detected value Te1 as the ECU temperature estimated value Tes at a time point t1 at which the sensor abnormality determination unit 51 determines that a temperature detection circuit is abnormal. The ECU temperature estimation unit 52 starts to increase the ECU temperature estimated value Tes at the time point t1 and outputs a value that gradually increases from the ECU temperature detected value Te1 that the first temperature detection circuit 45 detected at the time point t1 to the predetermined set value Ts at the constant increase rate ΔTr [° C./sec] as the ECU temperature estimated value Tes.

Likewise, when the ECU temperature estimation unit 52 has output the ECU temperature detected value Te2 as the ECU temperature estimated value Tes until immediately before the sensor abnormality determination unit 51 determines that a temperature detection circuit is abnormal, the ECU temperature estimation unit 52 outputs the ECU temperature detected value Te2 as the ECU temperature estimated value Tes at a time point t1 at which the sensor abnormality determination unit 51 determines that a temperature detection circuit is abnormal. The ECU temperature estimation unit 52 starts to increase the ECU temperature estimated value Tes at the time point t1 and outputs a value that gradually increases from the ECU temperature detected value Te2 that the second temperature detection circuit 46 detected at the time point t1 to the predetermined set value Ts at the constant increase rate ΔTr [° C./sec] as the ECU temperature estimated value Tes.

The ECU temperature estimation unit 52 may change the increase rate ΔTr according to the ECU temperature detected value Te1 that the first temperature detection circuit 45 detects or the ECU temperature detected value Te2 that the second temperature detection circuit 46 detects at the time point t1 at which the sensor abnormality determination unit 51 determines that a temperature detection circuit is abnormal.

For example, when the ECU temperature estimation unit 52 has output the ECU temperature detected value Te1 as the ECU temperature estimated value Tes until immediately before the sensor abnormality determination unit 51 determines that a temperature detection circuit is abnormal, the ECU temperature estimation unit 52 may set a lower increase rate ΔTr when the ECU temperature detected value Te1 is higher than in the case where the ECU temperature detected value Te1 is low. For example, the increase rate ΔTr may be set in such a manner that the higher the ECU temperature detected value Te1 is, the lower the increase rate ΔTr is.

When the ECU temperature estimation unit 52 has output the ECU temperature detected value Te2 as the ECU temperature estimated value Tes until immediately before the sensor abnormality determination unit 51 determines that a temperature detection circuit is abnormal, the ECU temperature estimation unit 52 may set a lower increase rate ΔTr when the ECU temperature detected value Te2 is higher than in the case where the ECU temperature detected value Te2 is low. For example, the increase rate ΔTr may be set in such a manner that the higher the ECU temperature detected value Te2 is, the lower the increase rate ΔTr is.

Figure 10:
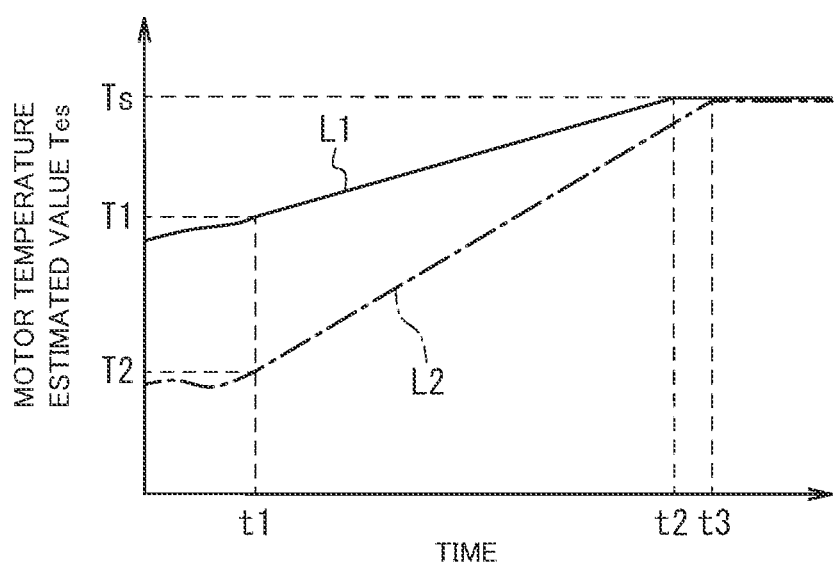
FIG. 10 is an explanatory diagram schematically illustrative of change in ECU temperature estimated value when a temperature detection circuit is abnormal.

FIG. 10 is an explanatory diagram schematically illustrative of change in the ECU temperature estimated value Tes when a temperature detection circuit is abnormal. Herein, a case where the ECU temperature detected value Te1 has been output as the ECU temperature estimated value Tes until immediately before the sensor abnormality determination unit 51 determines that a temperature detection circuit is abnormal will be described. When the ECU temperature detected value Te2 has been output as the ECU temperature estimated value Tes, the ECU temperature detected value Te1 is replaced by the ECU temperature detected value Te2.

A solid line L1 indicates temporal change in the ECU temperature estimated value Tes that is output from the ECU temperature estimation unit 52 when the ECU temperature detected value Te1 at the time point t1 at which the sensor abnormality determination unit 51 determines that a temperature detection circuit is abnormal is T1 that is comparatively high, and a dashed-dotted line L2 indicates temporal change in the ECU temperature estimated value Tes that is output from the ECU temperature estimation unit 52 when the ECU temperature detected value Te1 at the time point t1 is T2 that is comparatively low.

In the example in FIG. 10, even when the difference ΔTe becomes greater than or equal to the predetermined value ΔTt, the sensor abnormality determination unit 51 determines that the temperature detection circuit is not abnormal until a state in which the difference ΔTe is greater than or equal to the predetermined value ΔTt continues for a predetermined time length TL. Thus, until the time point t1 at which a period of time during which a state in which the difference ΔTe is greater than or equal to the predetermined value ΔTt continues has reached the predetermined time length TL, the ECU temperature estimation unit 52 outputs the ECU temperature detected value Te1 as the ECU temperature estimated value Tes. At the time point t1, the sensor abnormality determination unit 51 determines that a temperature detection circuit is abnormal.

When the ECU temperature detected value Te1 at the time point t1 is a temperature T1, the ECU temperature estimation unit 52 starts to increase the ECU temperature estimated value Tes at the time point t1 and outputs the ECU temperature estimated value Tes that gradually increases from the temperature T1 at a constant increase rate ΔTr1 [° C./sec] and reaches the set value Ts at a time point t2, as illustrated by the solid line L1.

On the other hand, when the ECU temperature detected value Te1 at the time point t1 is a temperature T2, the ECU temperature estimation unit 52 starts to increase the ECU temperature estimated value Tes at the time point t1 and outputs the ECU temperature estimated value Tes that gradually increases from the temperature T2 at a constant increase rate ΔTr2 [° C./sec] and reaches the set value Ts at a time point t3, as illustrated by the dashed-dotted line L2.

The sensor abnormality determination unit 51 may set the increase rate ΔTr1 in the case where the ECU temperature detected value Te1 at the time point t1 is the comparatively high temperature T1 to be lower than the increase rate ΔTr2 in the case where the ECU temperature detected value Te1 at the time point t1 is the comparatively low temperature T2. Since the higher the temperature of an object is, the larger heat dissipation from the object becomes, temperature rise of the object having a high temperature becomes slower even when the same amount of heat is added. By setting the increase rate ΔTr of the ECU temperature estimated value Tes in such a manner that the higher is the ECU temperature detected value Te1 at the time point t1 at which the sensor abnormality determination unit 51 determines that a temperature detection circuit is abnormal, the lower the increase rate ΔTr is, it is possible to prevent the ECU temperature estimated value Tes from becoming excessively high.

Figure 11:
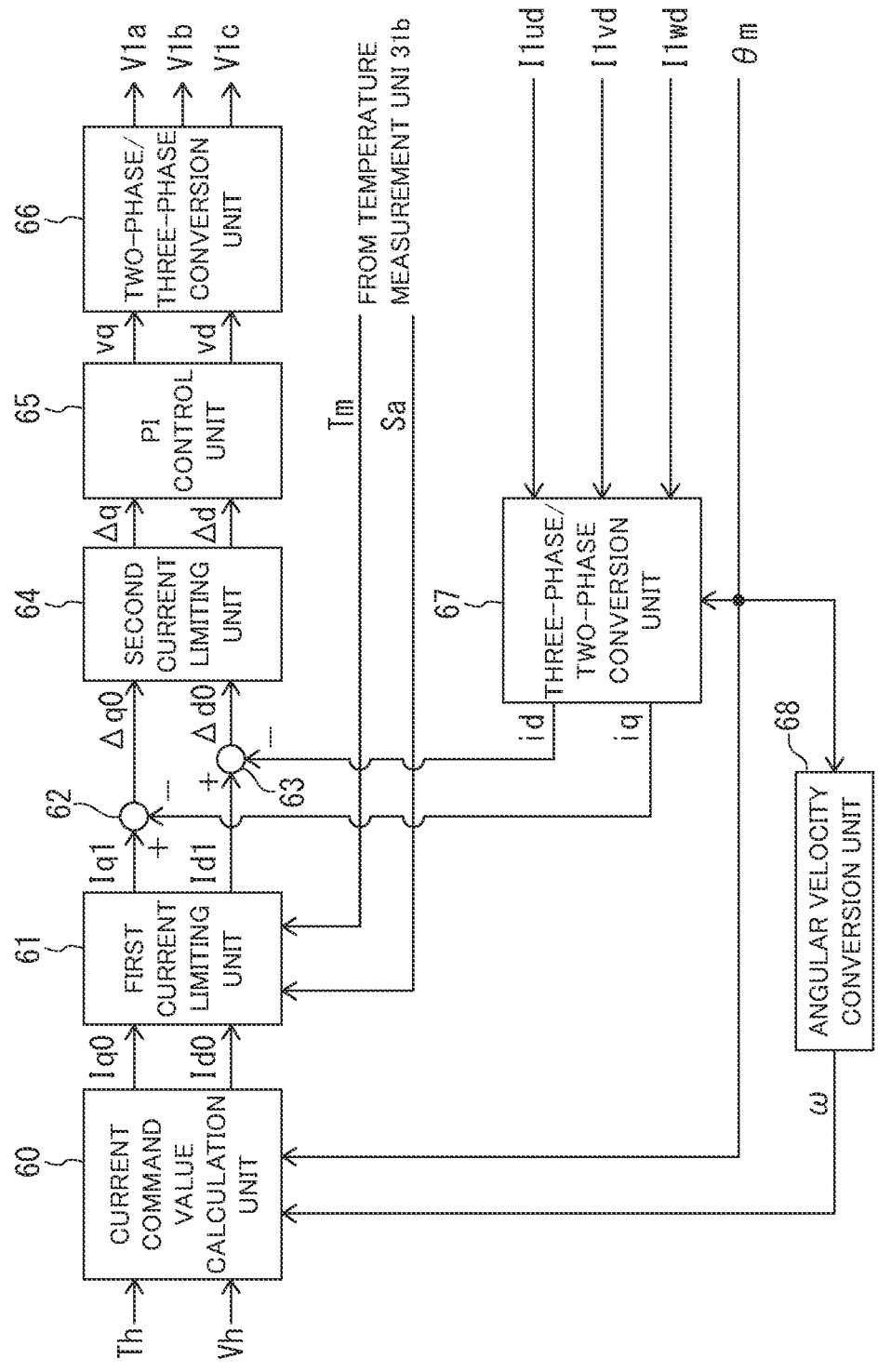
FIG. 11 is a block diagram of an example of a functional configuration of a control calculation device of the second embodiment.

FIG. 11 is a block diagram of an example of a functional configuration of the control calculation device 31 of the second embodiment. Note that although, in FIG. 11, only a functional configuration to drive the first coils of the motor 20 is described, a functional configuration to drive the second coils also has the same configuration. Note that description of constituent elements and functions common to the control calculation device 31 of the first embodiment illustrated in FIG. 6 will be omitted.

A first current limiting unit 61, by limiting a q-axis current command value Iq0 and a d-axis current command value Id0 based on the abnormality determination signal Sa and a motor temperature estimated value Tm output from the temperature measurement unit 31b, calculates a q-axis current command value Iq1 and a d-axis current command value Id1 after limitation.

For example, when the motor temperature estimated value Tm exceeds a second threshold value Tb1, the first current limiting unit 61 may, by limiting the q-axis current command value Iq0 and the d-axis current command value Id0 in such a manner that the higher the motor temperature estimated value Tm becomes, the more largely the q-axis current command value Iq0 and the d-axis current command value Id0 are limited, calculate the q-axis current command value Iq1 and the d-axis current command value Id1. That is, the first current limiting unit 61 may calculate the q-axis current command value Iq1 and the d-axis current command value Id1 that gradually decrease as the motor temperature estimated value Tm becomes higher.

In addition, for example, when the sensor abnormality determination unit 51 determines that a temperature detection circuit is abnormal, the first current limiting unit 61 may calculate the q-axis current command value Iq1 and the d-axis current command value Id1 having smaller values than the q-axis current command value Iq0 and the d-axis current command value Id0, respectively. For example, the first current limiting unit 61 may, by limiting the q-axis current command value Iq0 and the d-axis current command value Id0 to 50%, calculate the q-axis current command value Iq1 and the d-axis current command value Id1.

Note that when the sensor abnormality determination unit 51 determines that a temperature detection circuit is abnormal, the first current limiting unit 61 may calculate the q-axis current command value Iq1 and the d-axis current command value Id1 having smaller values than the q-axis current command value Iq0 and the d-axis current command value Id0, respectively (for example, the q-axis current command value Iq1 and the d-axis current command value Id1 having 50% of the q-axis current command value Iq0 and the d-axis current command value Id0, respectively) even when the motor temperature estimated value Tm does not exceed the second threshold value Tb1.

For example, the first current limiting unit 61 may set the above-described limiting gain K1 depending on the abnormality determination signal Sa and the above-described limiting gain K3 depending on the motor temperature estimated value Tm.

For example, the first current limiting unit 61 may provide the limiting gain K3 with hysteresis characteristics. For example, when a value of the limiting gain K3 becomes "1", the first current limiting unit 61 gradually decreases the value of the limiting gain K3 from "1" according to rise of the motor temperature estimated value Tm from the second threshold value Tb1 when the motor temperature estimated value Tm exceeds the second threshold value Tb1. Unless the motor temperature estimated value Tm reaches a sixth threshold value Tb2 (that is, unless a value of a limiting gain K2 becomes "0"), the first current limiting unit 61 decreases or increases the value of the limiting gain K3 within a range from "1" to "0" according to rise or fall of the motor temperature estimated value Tm within a range from the second threshold value Tb1 to the sixth threshold value Tb2.

When the motor temperature estimated value Tm reaches the sixth threshold value Tb2 (that is, the value of the limiting gain K3 becomes "0"), the first current limiting unit 61 does not increase the value of the limiting gain K3 from "0" even when the motor temperature estimated value Tm becomes less than the sixth threshold value Tb2. When the motor temperature estimated value Tm decreases to a value less than a seventh threshold value Tb3 that is smaller than the sixth threshold value Tb2, the first current limiting unit 61 may start to increase the limiting gain K3 and gradually increase the value of the limiting gain K3 from "0" to "1" according to fall of the motor temperature estimated value Tm to an eighth threshold value Tb4 that is smaller than the second threshold value Tb1. For example, the seventh threshold value Tb3 may be set to a value lower than the second threshold value Tb1 or may be set to a value higher than the second threshold value Ttb1.

Unless the motor temperature estimated value Tm reaches the eighth threshold value Tb4 (that is, unless the value of the limiting gain K3 becomes "1"), the first current limiting unit 61 decreases or increases the value of the limiting gain K3 within a range from "0" to "1" according to rise or fall of the motor temperature estimated value Tm within a range from the seventh threshold value Tb3 to the eighth threshold value Tb4.

The first current limiting unit 61 calculates products obtained by multiplying the q-axis current command value Iq0 and the d-axis current command value Id0 by the limiting gains K1 and K3 as the q-axis current command value Iq1=K1×K3×Iq0 and the d-axis current command value Id1=K1×K3×Id0.

Note that the temperature measurement unit 31b of the second embodiment may also output ECU temperature Te in a similar manner to the temperature measurement unit 31b of the first embodiment.

In addition, the first current limiting unit 61 of the second embodiment may also, by limiting the q-axis current command value Iq0 and the d-axis current command value Id0 based on the abnormality determination signal Sa, the ECU temperature Te, and the motor temperature estimated value Tm output from the temperature measurement unit 31b, calculate a q-axis current command value Iq1 and a d-axis current command value Id1 after limitation in a similar manner to the first current limiting unit 61 of the first embodiment.

Figure 12:
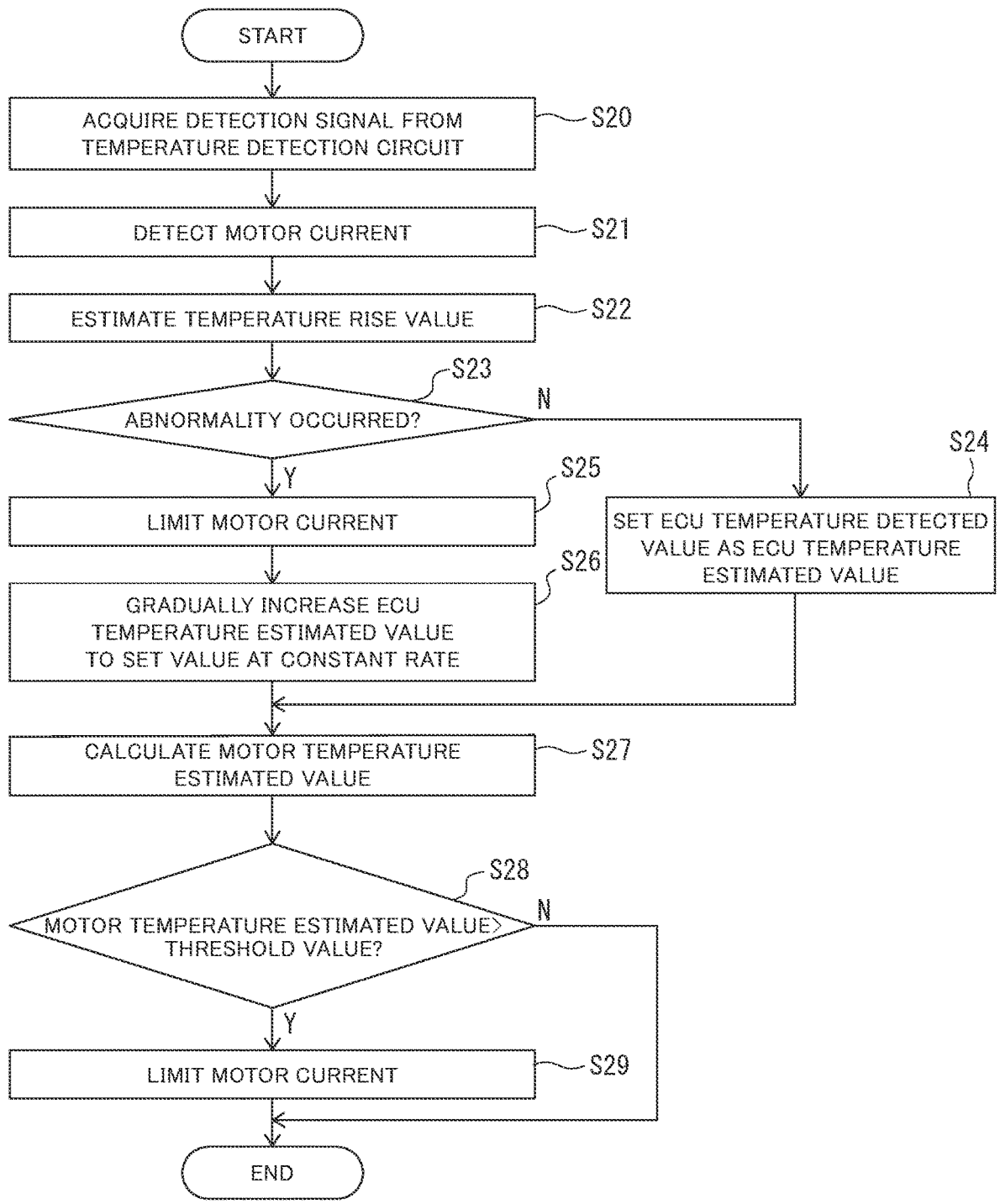
FIG. 12 is a flowchart of an example of a motor control method of the second embodiment.

FIG. 12 is a flowchart of an example of a motor control method of the second embodiment.

Processing in step S20 is the same as the processing in step S1 in FIG. 7. Processing in steps S21 to S29 is the same as the processing in steps S5 to S13 in FIG. 7.

Figure 13:
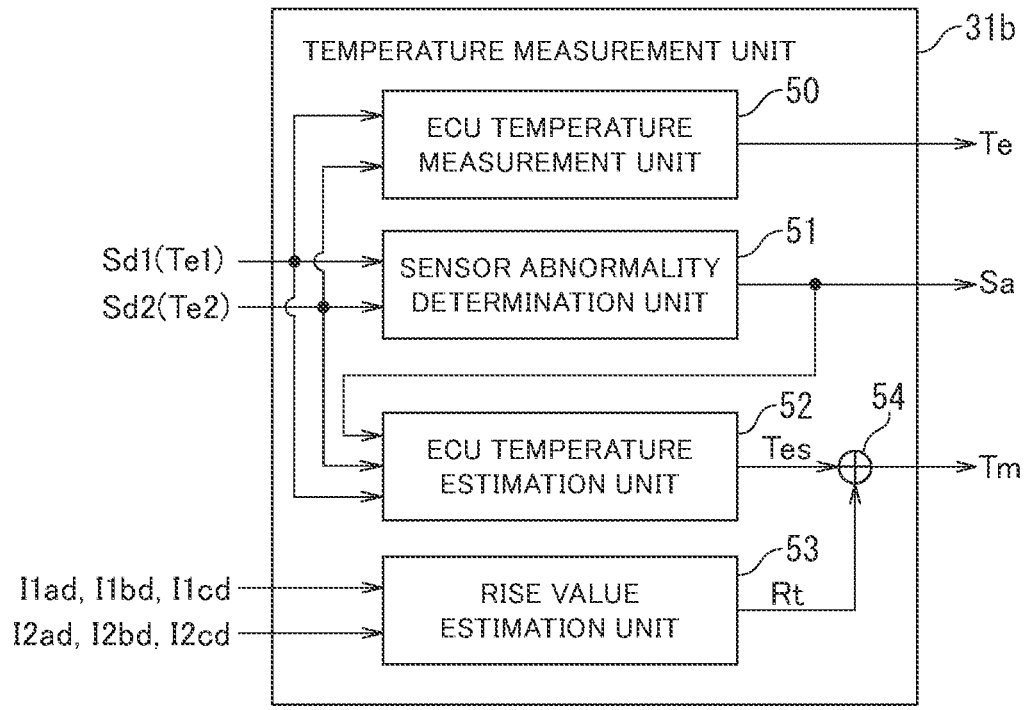
FIG. 13 is a block diagram of an example of a functional configuration of a variation of a temperature measurement unit.

FIG. 13 is a block diagram of an example of a functional configuration of a variation of the temperature measurement unit 31b. The variation of the temperature measurement unit 31b includes an ECU temperature measurement unit 50 in addition to the configuration of the temperature measurement unit 31b of the second embodiment illustrated in FIG. 9.

The ECU temperature measurement unit 50 measures ECU temperature Te that is the temperature of the first power conversion circuit 42A and the second power conversion circuit 42B, based on the ECU temperature detected value Te1 and the ECU temperature detected value Te2. The ECU temperature measurement unit 50 may select one of the ECU temperature detected value Te1 and the ECU temperature detected value Te2 and output the selected one as the ECU temperature Te. For example, the ECU temperature measurement unit 50 may output a higher detected value between the ECU temperature detected value Te1 and the ECU temperature detected value Te2 as the ECU temperature Te or output a lower detected value as the ECU temperature Te.

Advantageous Effects of Second Embodiment (1) The ECU 30 includes the first power conversion circuit 42A and the second power conversion circuit 42B configured to control motor currents flowing through the motor 20, the temperature detection circuits 45 and 46 including the temperature sensors 45a and 46a, respectively, arranged in a vicinity of the first power conversion circuit 42A and the second power conversion circuit 42B, the rise value estimation unit 53 configured to estimate the rise value Rt of the temperature of the motor 20 due to the motor currents, the sensor abnormality determination unit 51 configured to determine whether or not a temperature detection circuit is abnormal, the ECU temperature estimation unit 52 configured to, when the temperature detection circuits are determined not to be abnormal, output detected temperature detected by the temperature detection circuit 45 or 46 as the ECU temperature estimated value Tes and, when a temperature detection circuit is determined to be abnormal, output a value gradually increasing from a detected temperature detected by the temperature detection circuit 45 or 46 to the predetermined set value Ts at a constant increase rate ΔTr as the ECU temperature estimated value Tes, the adder 54 configured to calculate a value obtained by adding the rise value Rt to the ECU temperature estimated value Tes as the motor temperature estimated value Tm, and the first current limiting unit 61 configured to, when the motor temperature estimated value Tm exceeds a predetermined threshold value, limit the motor currents in such a way that the motor currents gradually decrease as the motor temperature estimated value Tm becomes higher.

Because of this configuration, it is possible to prevent the motor temperature estimated value Tm from rapidly increasing and the motor current from being excessively limited when an abnormality occurs in a temperature detection circuit. In addition, by limiting the motor current in such a way that the motor current gradually decreases even when the motor temperature estimated value Tm exceeds a predetermined threshold value, it is possible to suppress the increase of the motor temperature estimated value Tm and to prevent limitation of the motor current from becoming excessive.

(2) The temperature detection circuits 45 and 46 include the temperature sensors 45a and 46a and may output a detection signal indicating the ECU temperature detected value Te1 depending on output from the temperature sensor 45a and a detection signal indicating the ECU temperature detected value Te2 depending on output from the temperature sensor 46a, respectively. The sensor abnormality determination unit 51 may determine that a temperature detection circuit is abnormal when a difference ΔTe between, of the ECU temperature detected values Te1 and Te2, a first detected temperature that is higher than the other and a second detected temperature that is lower than the other is greater than or equal to the predetermined value ΔTt. When the temperature detection circuits are determined to be normal, the ECU temperature estimation unit 52 may output the first detected temperature as the ECU temperature estimated value Tes.

Determining whether or not a temperature detection circuit is abnormal based on the ECU temperature detected values Te1 and Te2 detected by a plurality of temperature detection circuits 45 and 46 as described above enables an abnormality in a temperature detection circuit to be determined more accurately and more quickly than a case where a single temperature detection circuit is included.

(3) When a state in which the difference ΔTe between the first detected temperature and the second detected temperature is greater than or equal to the predetermined value ΔTt continues for a predetermined time length TL or longer, the sensor abnormality determination unit 51 may determine that a temperature detection circuit is abnormal. The ECU temperature estimation unit 52 may output a value that gradually increases as time elapses from the first detected temperature that the temperature detection circuit 45 or 46 outputs at a time point at which a state in which the difference ΔTe is greater than or equal to the predetermined value ΔTt has continued for the predetermined time length TL to the predetermined set value Ts at the constant increase rate ΔTr as the ECU temperature estimated value Tes.

Because of this configuration, it is possible to prevent an abnormality in a temperature detection circuit from being erroneously detected based on a temporary increase in the difference ΔTe due to influence of, for example, noise.

(4) When a temperature detection circuit is determined to be abnormal, the ECU temperature estimation unit 52 may output the ECU temperature estimated value Tes that gradually increases at a lower increase rate ΔTr when detected temperature that the temperature detection circuit 45 or 46 detected is higher than in the case where the detected temperature is low.

Because of this configuration, it is possible to prevent the ECU temperature estimated value Tes from becoming excessively high when the detected temperature detected by the temperature detection circuit 45 or 46 at a time point at which a temperature detection circuit is determined to be abnormal is high.

Third Embodiment

A configuration of an ECU 30 of a third embodiment has the same configuration as the configuration of the ECU 30 of the second embodiment that was described with reference to FIG. 8. In addition, a configuration of a control calculation device 31 of the third embodiment has the same configuration as the configuration of the control calculation device 31 of the first embodiment that was described with reference to FIG. 6. Note that description of constituent elements and functions common to the ECU 30 of the second embodiment and the control calculation device 31 of the first embodiment will be omitted.

FIG. 8 is now referred to. A first temperature sensor 45a of a first temperature detection circuit 45 and a second temperature sensor 46a of the second temperature detection circuit 46 are mounted on the same circuit board as a circuit board on which FETs Q1 to Q6 of a first power conversion circuit 42A and FETs Q1 to Q6 of a second power conversion circuit 42B that are heat generating components are mounted.

Figure 14:
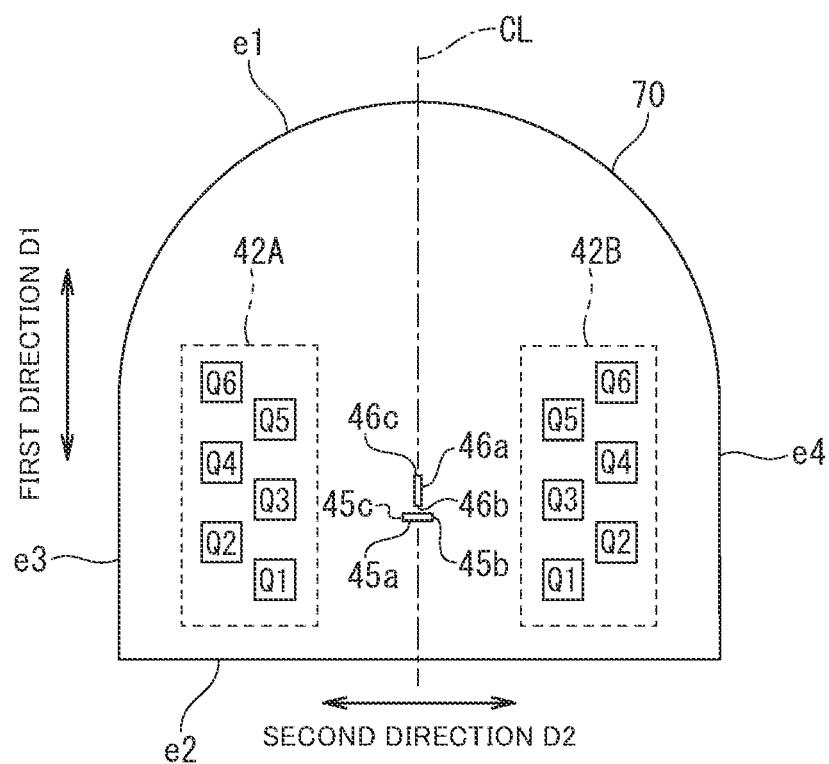
FIG. 14 is a schematic diagram of a relative positional relationship between power conversion circuits and temperature detection elements that are mounted on a circuit board.

FIG. 14 is a schematic diagram of a relative positional relationship between power conversion circuits (the first power conversion circuit 42A and the second power conversion circuit 42B) and temperature sensors (the first temperature sensor 45a and the second temperature sensor 46a) that are mounted on a circuit board 70. In the following description, two orthogonal axial directions that are parallel with a component mounting surface of the circuit board 70 are each referred to as a first direction D1 and a second direction D2.

As illustrated in FIG. 14, the circuit board 70 has, in top view, a semi-oval shape into which an oval shape is divided along the minor axis, and one edge portion e1 of both edge portions e1 and e2 in the first direction D1 is formed in a circular-arc shape and the other edge portion e2 is formed in a linear shape.

The first power conversion circuit 42A and the second power conversion circuit 42B are arranged in the second direction D2, and the first temperature sensor 45a and the second temperature sensor 46a are arranged between the first power conversion circuit 42A and the second power conversion circuit 42B in the second direction D2. Arranging the first temperature sensor 45a and the second temperature sensor 46a between the first power conversion circuit 42A and the second power conversion circuit 42B as described above enables a temperature abnormality in both the first power conversion circuit 42A and the second power conversion circuit 42B to be excellently detected without the detection being biased to either the first power conversion circuit 42A or the second power conversion circuit 42B.

For example, the first temperature sensor 45a and the second temperature sensor 46a may be arranged in a vicinity of a branch point Pb at which a positive electrode-side line Lp of a power wiring PW (see FIG. 8) branches into a first positive electrode-side line LpA and a second positive electrode-side line LpB. For example, the first temperature sensor 45a and the second temperature sensor 46a may be arranged at a position that is a position on the side of the vicinity of the branch point Pb on which the power conversion circuits 42A and 42B are located and is located between the first positive electrode-side line LpA and the second positive electrode-side line LpB.

Arranging the first temperature sensor 45a and the second temperature sensor 46a in the vicinity of the branch point Pb from which the first positive electrode-side line LpA and the second positive electrode-side line LpB that are power supply lines to the first power conversion circuit 42A and the second power conversion circuit 42B branch off enables the first temperature sensor 45a and the second temperature sensor 46a to be easily arranged between the first power conversion circuit 42A and the second power conversion circuit 42B.

For example, the first temperature sensor 45a and the second temperature sensor 46a may be arranged on a central line CL that passes substantially the center in the second direction D2 of the circuit board 70 (that is, the central line CL extending in the first direction D1). Arranging the first temperature sensor 45a and the second temperature sensor 46a on the central line CL enables the first temperature sensor 45a and the second temperature sensor 46a to be easily arranged between the first power conversion circuit 42A and the second power conversion circuit 42B. In addition, since heat is likely to be accumulated at the center of the circuit board 70, arranging the first temperature sensor 45a and the second temperature sensor 46a at a location that is likely to have a high temperature enables overheat of the ECU 30 to be easily detected.

Further, the first temperature sensor 45a and the second temperature sensor 46a may be arranged close to each other. Arranging the first temperature sensor 45a and the second temperature sensor 46a close to each other enables thermal coupling between the first temperature sensor 45a and the second temperature sensor 46a to be close. As a result, detected temperature by the first temperature sensor 45a and detected temperature by the second temperature sensor 46a can be brought close to each other.

Because of this configuration, it is possible to detect an abnormality occurring in the first temperature detection circuit 45 and the second temperature detection circuit 46, based on a difference between detected temperatures by the first temperature sensor 45*a* and the second temperature sensor 46*a*.

In addition, the first temperature sensor 45*a* and the second temperature sensor 46*a* may be mounted on the circuit board 70 in such a way as to be oriented in different directions from each other. In FIG. 14, reference signs 45*b* and 45*c* denote both end electrodes of the first temperature sensor 45*a* that is a thermistor, and reference signs 46*b* and 46*c* denote both end electrodes of the second temperature sensor 46*a* that is a thermistor.

In the example in FIG. 14, the both end electrodes 45*b* and 45*c* of the first temperature sensor 45*a* are arranged in the second direction D2 and the both end electrodes 46*b* and 46*c* of the second temperature sensor 46*a* are arranged in the first direction D1, and the direction of the first temperature sensor 45*a* and the direction of the second temperature sensor 46*a* are orthogonal to each other.

By orienting the first temperature sensor 45*a* and the second temperature sensor 46*a* in different directions as described above, the first temperature sensor 45*a* and the second temperature sensor 46*a* being damaged at the same time when stress is applied to the circuit board 70 can be avoided.

As described in the foregoing, when an abnormality occurring in the first temperature detection circuit 45 and the second temperature detection circuit 46 is detected based on a difference between detected temperatures by the first temperature sensor 45*a* and the second temperature sensor 46*a*, there is a risk that occurrence of an abnormality becomes undetectable when the same abnormality occurs in both sensors and there is no difference between detected temperatures. By avoiding both sensors being damaged at the same time due to stress applied to the circuit board 70, occurrence of the same abnormality in both sensors due to damage inflicted by the stress can be prevented.

The FETs Q1 to Q6 included in each of the first power conversion circuit 42A and the second power conversion circuit 42B and the temperature sensors (the first temperature sensor 45*a* and the second temperature sensor 46*a*) may be thermally connected to the same heat dissipation member (heat sink). Since the heat dissipation member is made of a material having an excellent thermal conductivity, thermally connecting the FETs Q1 to Q6 that are heat-generating members, the first temperature sensor 45*a*, and the second temperature sensor 46*a* to the same heat dissipation member enables a temperature abnormality in the first power conversion circuit 42A and the second power conversion circuit 42B to be more easily detected.

In addition, thermally connecting the first temperature sensor 45*a* and the second temperature sensor 46*a* to the same heat dissipation member causes thermal coupling between the first temperature sensor 45*a* and the second temperature sensor 46*a* to be closer and enables detected temperature by the first temperature sensor 45*a* and detected temperature by the second temperature sensor 46*a* to be brought closer to each other.

Figure 15:
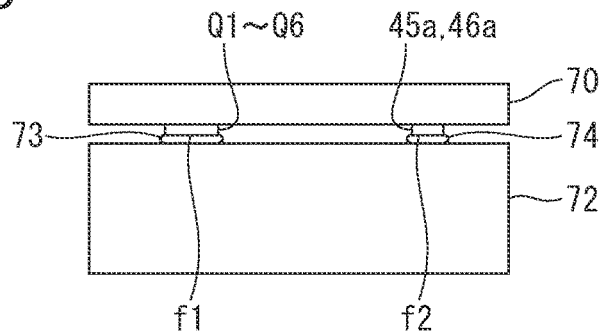
FIG. 15 is a schematic diagram of a heat dissipation structure that dissipates heat that the power conversion circuits generate.

FIG. 15 is a schematic diagram of a heat dissipation structure that dissipates heat that the first power conversion circuit 42A and the second power conversion circuit 42B generate. A heat dissipation member 72 may be a heat sink formed of a metal, such as aluminum alloy, having an excellent thermal conductivity.

Surfaces f1 of the FETs Q1 to Q6 included in each of the first power conversion circuit 42A and the second power conversion circuit 42B on the opposite side to the circuit board 70 and surfaces f2 of the first temperature sensor 45*a* and the second temperature sensor 46*a* on the opposite side to the circuit board 70 are thermally connected to the same heat sink 72. For example, the surfaces f1 and f2 are brought into contact with the heat sink 72 via thermal interface materials (TIMs) 73 and 74, such as conductive paste (for example, heat dissipating grease), respectively.

The FETs Q1 to Q6 may be, for example, switching elements having a heat dissipation structure on the top surface (upper surface). For example, the FETs Q1 to Q6 may be switching elements in which a thermal pad connected to a source pad is exposed from a package (mold) made of resin that seals a die on a surface (upper surface) on the opposite side to a surface (bottom surface) on which a drain pad is disposed. In addition, for example, the FETs Q1 to Q6 may be switching element that have a mold formed of a resin having high thermal conductivity and in which a mold on the surface on the opposite side to the surface on which the drain pad is disposed is thinned.

Figure 16:
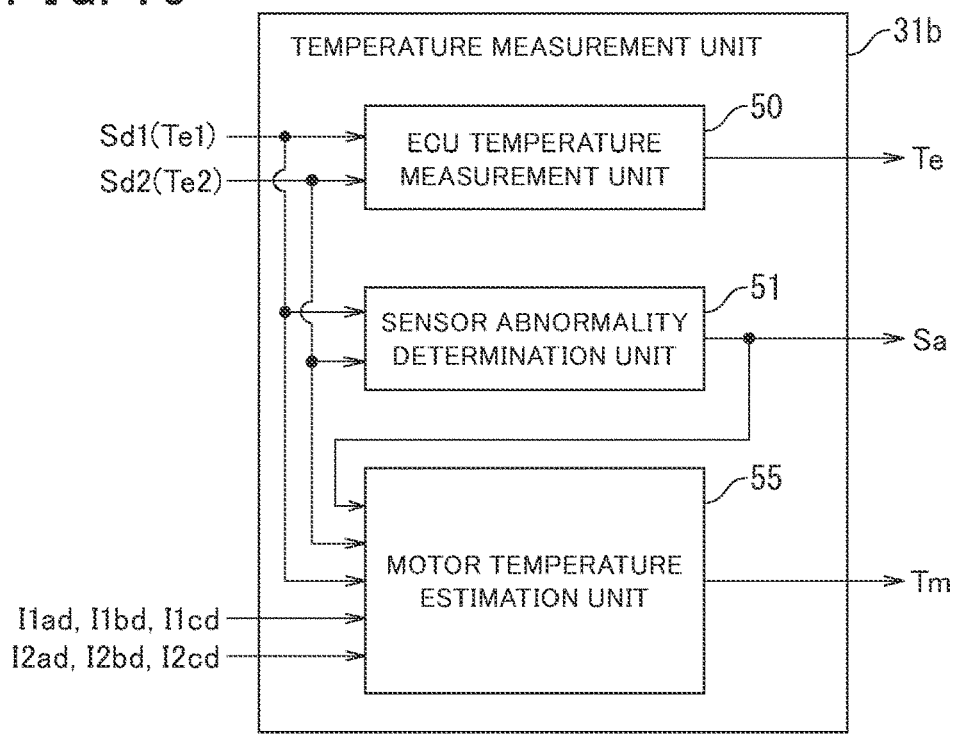
FIG. 16 is a block diagram of an example of a functional configuration of a temperature measurement unit of the third embodiment.

FIG. 16 is a block diagram of an example of a functional configuration of a temperature measurement unit 31*b* of the third embodiment. The temperature measurement unit 31*b* includes a sensor abnormality determination unit 51, an ECU temperature estimation unit 50, and a motor temperature estimation unit 55. Since functions of the sensor abnormality determination unit 51 of the third embodiment are the same as the functions of the sensor abnormality determination unit 51 of the second embodiment and functions of the ECU temperature measurement unit 50 of the third embodiment are the same as the functions of the ECU temperature measurement unit 50 of the variation of the second embodiment, description thereof will be omitted.

The motor temperature estimation unit 55 estimates motor temperature of a motor 20. Specifically, the motor temperature estimation unit 55 estimates ECU temperature (that is, calculates an ECU temperature estimated value Tes), based on an ECU temperature detected value Te1, an ECU temperature detected value Te2, and an abnormality determination signal Sa output from the sensor abnormality determination unit 51 and estimates motor temperature, based on the ECU temperature estimated value Tes and detected values I1ad, I1bd, I1cd, I2ad, I2bd, and I2cd of motor currents.

When the sensor abnormality determination unit 51 determines that the temperature detection circuit is not abnormal, the motor temperature estimation unit 55 selects one of the ECU temperature detected value Te1 and the ECU temperature detected value Te2 as the ECU temperature estimated value Tes. For example, the motor temperature estimation unit 55 may select a higher detected value between the ECU temperature detected value Te1 and the ECU temperature detected value Te2 as the ECU temperature estimated value Tes or select a lower detected value as the ECU temperature estimated value Tes.

When the sensor abnormality determination unit 51 determines that a temperature detection circuit is abnormal, the motor temperature estimation unit 55 calculates a value that gradually increases from the ECU temperature detected value Te1 or the ECU temperature detected value Te2 to a predetermined set value Ts at a constant increase rate $\Delta Tr$ [° C./sec] as the ECU temperature estimated value Tes.

Figure 17:
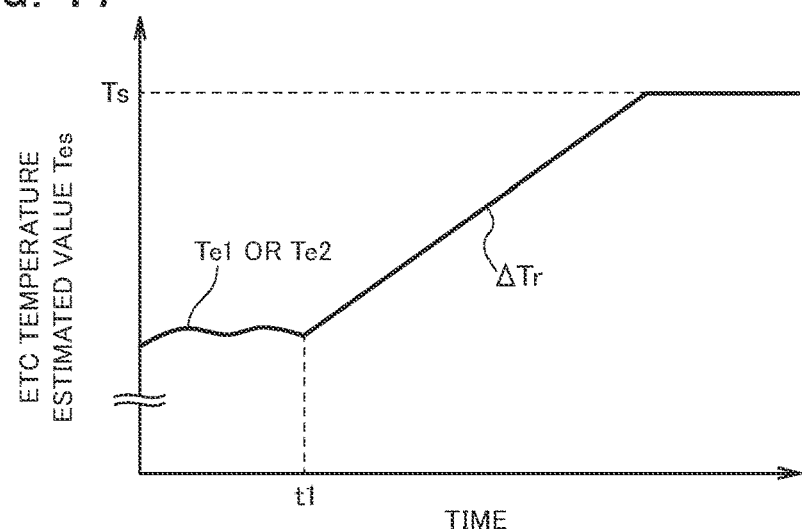
FIG. 17 is an explanatory diagram schematically illustrative of a calculation method of an ECU temperature estimated value when a temperature detection circuit is abnormal.

FIG. 17 is an explanatory diagram schematically illustrative of a calculation method of the ECU temperature estimated value Tes when a temperature detection circuit is abnormal. For example, when the motor temperature estimation unit 55 has selected the ECU temperature detected value Te1 as the ECU temperature estimated value Tes until immediately before a time point t1 at which the sensor abnormality determination unit 51 determines that a temperature detection circuit is abnormal, the motor temperature estimation unit 55 sets the ECU temperature detected value Te1 as the ECU temperature estimated value Tes at the time point t1 at which the sensor abnormality determination unit 51 determines that a temperature detection circuit is abnormal. The motor temperature estimation unit 55 starts to increase the ECU temperature estimated value Tes at the time point t1 and calculates a value that gradually increases from the ECU temperature detected value Te1 that the first temperature detection circuit 45 detected at the time point t1 to the predetermined set value Ts at the constant increase rate ΔTr as the ECU temperature estimated value Tes.

In contrast, when the motor temperature estimation unit 55 has selected the ECU temperature detected value Te2 as the ECU temperature estimated value Tes until immediately before the time point t1 at which the sensor abnormality determination unit 51 determines that a temperature detection circuit is abnormal, the motor temperature estimation unit 55 sets the ECU temperature detected value Te2 as the ECU temperature estimated value Tes at the time point t1 at which the sensor abnormality determination unit 51 determines that a temperature detection circuit is abnormal. The motor temperature estimation unit 55 starts to increase the ECU temperature estimated value Tes at the time point t1 and calculates a value that gradually increases from the ECU temperature detected value Te2 that the second temperature detection circuit 46 detected at the time point t1 to the predetermined set value Ts at the constant increase rate ΔTr as the ECU temperature estimated value Tes.

FIG. 16 is now referred to. The motor temperature estimation unit 55 estimates a rise value Rt of motor temperature due to motor currents flowing through the motor 20. For example, the motor temperature estimation unit 55 may estimate the rise value Rt by subtracting the amount of heat dissipation of the motor 20 from an integral value of a square sum of the detected values I1ad, I1bd, I1cd, I2ad, I2bd, and I2cd of the motor currents.

The motor temperature estimation unit 55 calculates a value obtained by adding the rise value Rt to the ECU temperature estimated value Tes as a motor temperature estimated value Tm.

Note that a motor control method of the third embodiment is the same as the motor control method that was described with reference to the flowchart in FIG. 7.

Advantageous Effects of Third Embodiment (1) The ECU 30 includes the circuit board 70, the first power conversion circuit 42A mounted on the circuit board 70 and configured to supply currents to drive a motor 20, the second power conversion circuit 42B mounted on the circuit board 70 and configured to supply currents to drive a motor 20 that is identical to or different from the motor 20 to which currents from the first power conversion circuit 42A are supplied, the temperature detection circuits 45 and 46 including the temperature sensors 45a and 46a, respectively, and a first current limiting unit 61 configured to limit currents that the first power conversion circuit 42A supplies and currents that the second power conversion circuit 42B supplies based on temperature that the temperature detection circuits 45 and 46 detect. The temperature sensors 45a and 46a are mounted on the circuit board 70 on which the first power conversion circuit 42A and the second power conversion circuit 42B are mounted and are arranged at a position between the first power conversion circuit 42A and the second power conversion circuit 42B.

This configuration enables a temperature abnormality in both the first power conversion circuit 42A and the second power conversion circuit 42B to be excellently detected without the detection being biased to either the first power conversion circuit 42A or the second power conversion circuit 42B.

(2) Surfaces of the switching elements included in the first power conversion circuit 42A on the opposite side to the circuit board 70, surfaces of the switching elements included in the second power conversion circuit 42B on the opposite side to the circuit board 70, and surfaces of the first temperature sensor 45a and the second temperature sensor 46a on the opposite side to the circuit board 70 may be thermally connected to the same heat dissipation member 72.

This configuration enables a temperature abnormality in the first power conversion circuit 42A and the second power conversion circuit 42B to be more easily detected.

(3) The temperature sensors 45a and 46a may be arranged substantially at the center of the circuit board 70 in an arrangement direction in which the first power conversion circuit 42A and the second power conversion circuit 42B are arranged on the circuit board 70.

This configuration enables the first temperature sensor 45a and the second temperature sensor 46a to be easily arranged between the first power conversion circuit 42A and the second power conversion circuit 42B. In addition, since heat is likely to be accumulated at the center of the circuit board 70, arranging the first temperature sensor 45a and the second temperature sensor 46a at a location that is likely to have a high temperature enables overheat of the ECU 30 to be easily detected.

(4) The sensor abnormality determination unit 51 may determine whether or not the temperature detection circuits 45 and 46 are abnormal based on a difference between detected temperature depending on output from the first temperature sensor 45a and detected temperature depending on output from the second temperature sensor 46a and arrange the first temperature sensor 45a and the second temperature sensor 46a close to each other.

This configuration enables thermal coupling between the first temperature sensor 45a and the second temperature sensor 46a to be close. As a result, detected temperature by the first temperature sensor 45a and detected temperature by the second temperature sensor 46a can be brought close to each other, and an abnormality having occurred in the temperature detection circuit 45 or 46 can be detected with high precision, based on a difference between detected temperatures by the first temperature sensor 45a and the second temperature sensor 46a.

(5) The sensor abnormality determination unit 51 may determine whether or not the temperature detection circuits 45 and 46 are abnormal based on a difference between detected temperature depending on output from the first temperature sensor 45a and detected temperature depending on output from the second temperature sensor 46a, and a surface of the first temperature detection element on the opposite side to the circuit board 70 and a surface of the second temperature detection element on the opposite side to the circuit board 70 may be thermally connected to the same heat dissipation member 72.

This configuration causes thermal coupling between the first temperature sensor 45a and the second temperature sensor 46a to be closer and enables detected temperature by the first temperature sensor 45a and detected temperature by the second temperature sensor 46a to be brought closer to each other.

(6) The first temperature sensor 45a and the second temperature sensor 46a may be temperature detection elements having the same structure, and the first temperature sensor 45a and the second temperature sensor 46a may be mounted on the circuit board 70 in such a way as to be oriented in different directions from each other.

This configuration enables the first temperature sensor 45a and the second temperature sensor 46a being damaged at the same time when stress is applied to the circuit board 70 to be avoided. Thus, it is possible to prevent the first temperature sensor 45a and the second temperature sensor 46a to be prevented from malfunctioning at the same time.

Variations

Although, in the foregoing description, an example in which the motor control device of the present invention is applied to an electric power steering device using a column assist system that is referred to as a so-called upstream assist system was described, the motor control device of the present invention may be applied to an electric power steering device using a downstream assist system. Hereinafter, as an example of the electric power steering device using the downstream assist system, configuration examples in which the motor control device of the present invention is applied to electric power steering devices using a single pinion assist system, a rack assist system, and a dual pinion assist system will be described.

Figure 18:
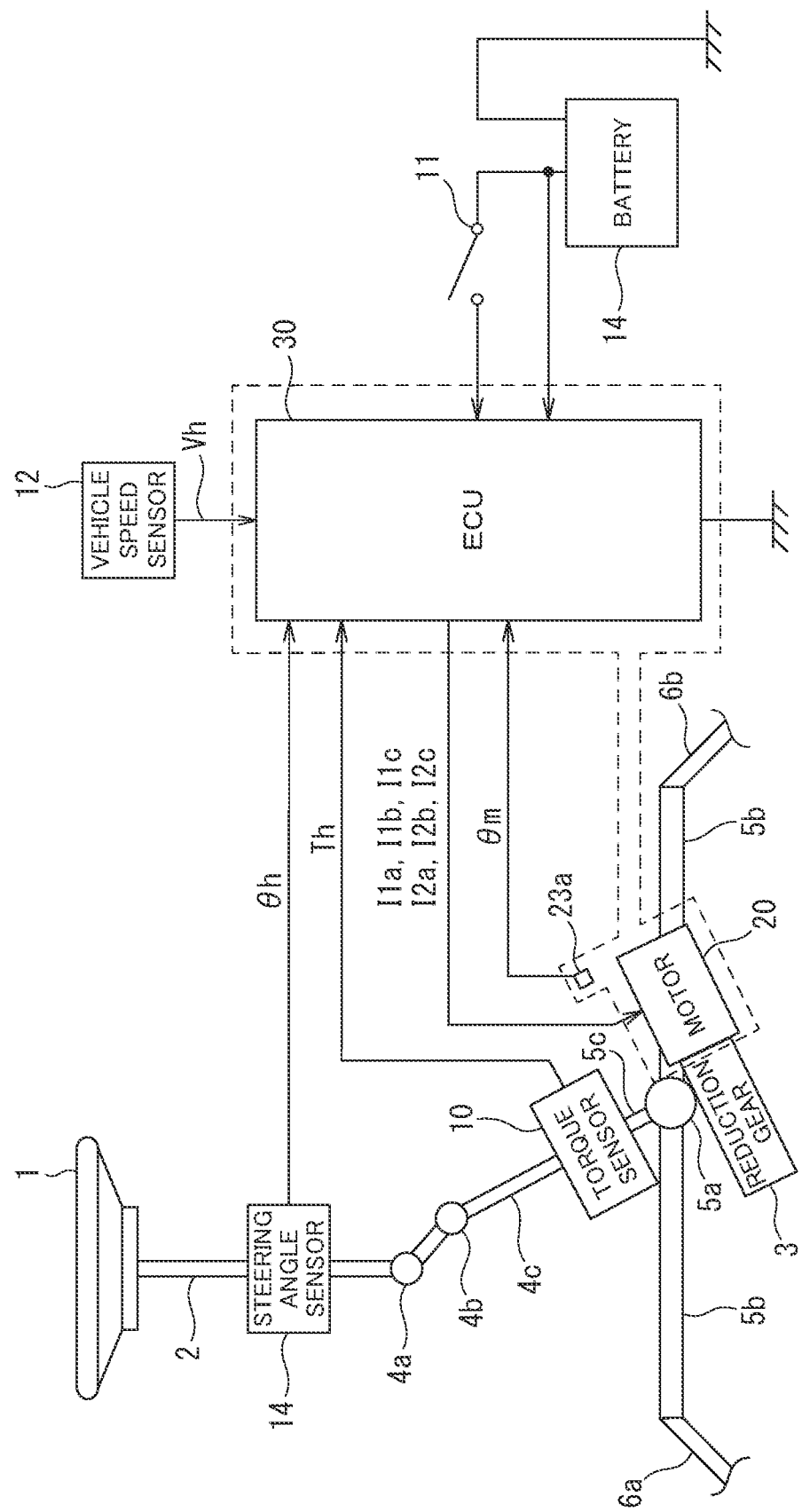
FIG. 18 is a configuration diagram illustrative of an outline of a first variation of the electric power steering device.
Figure 19:
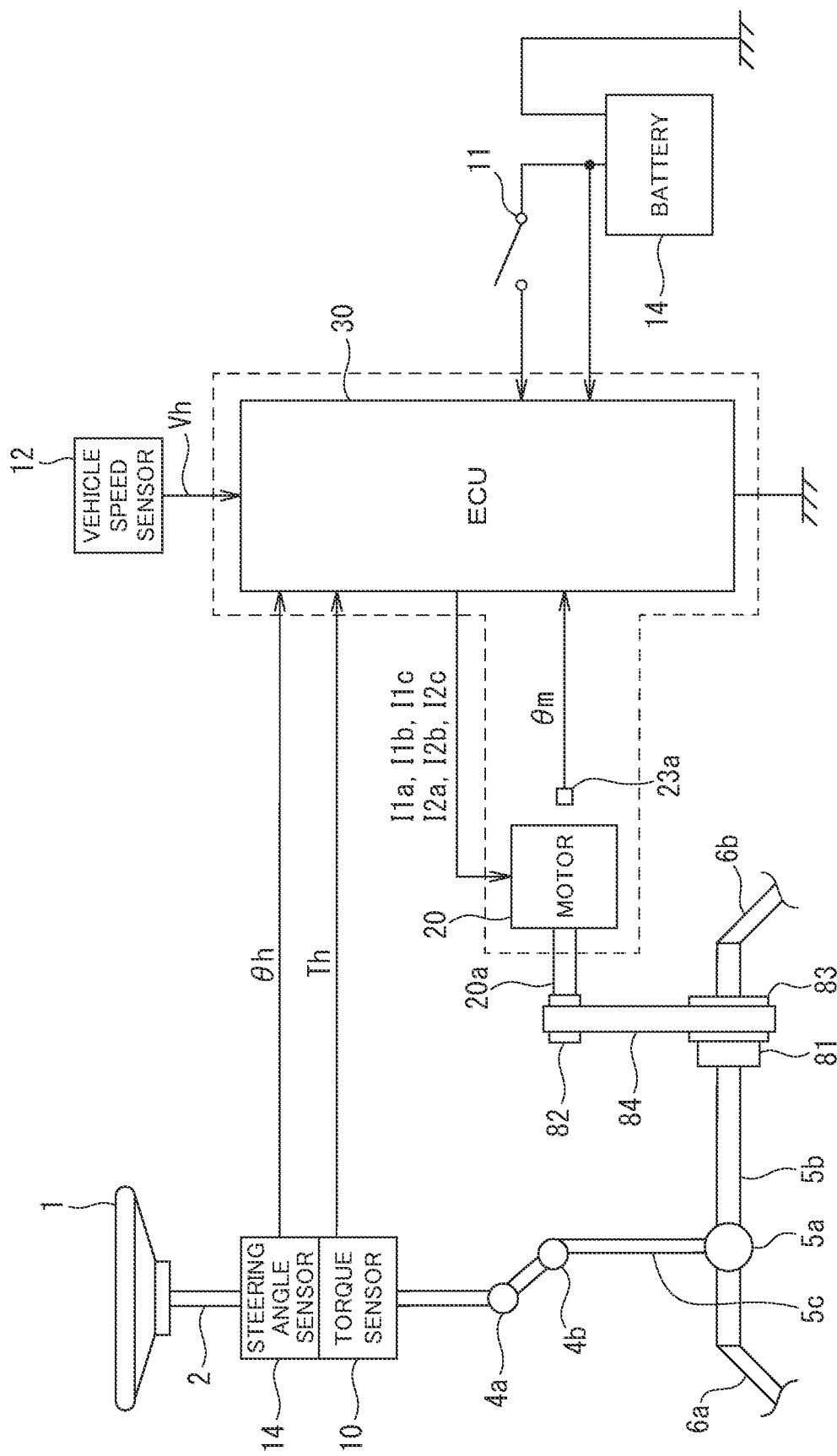
FIG. 19 is a configuration diagram illustrative of an outline of a second variation of the electric power steering device.
Figure 20:
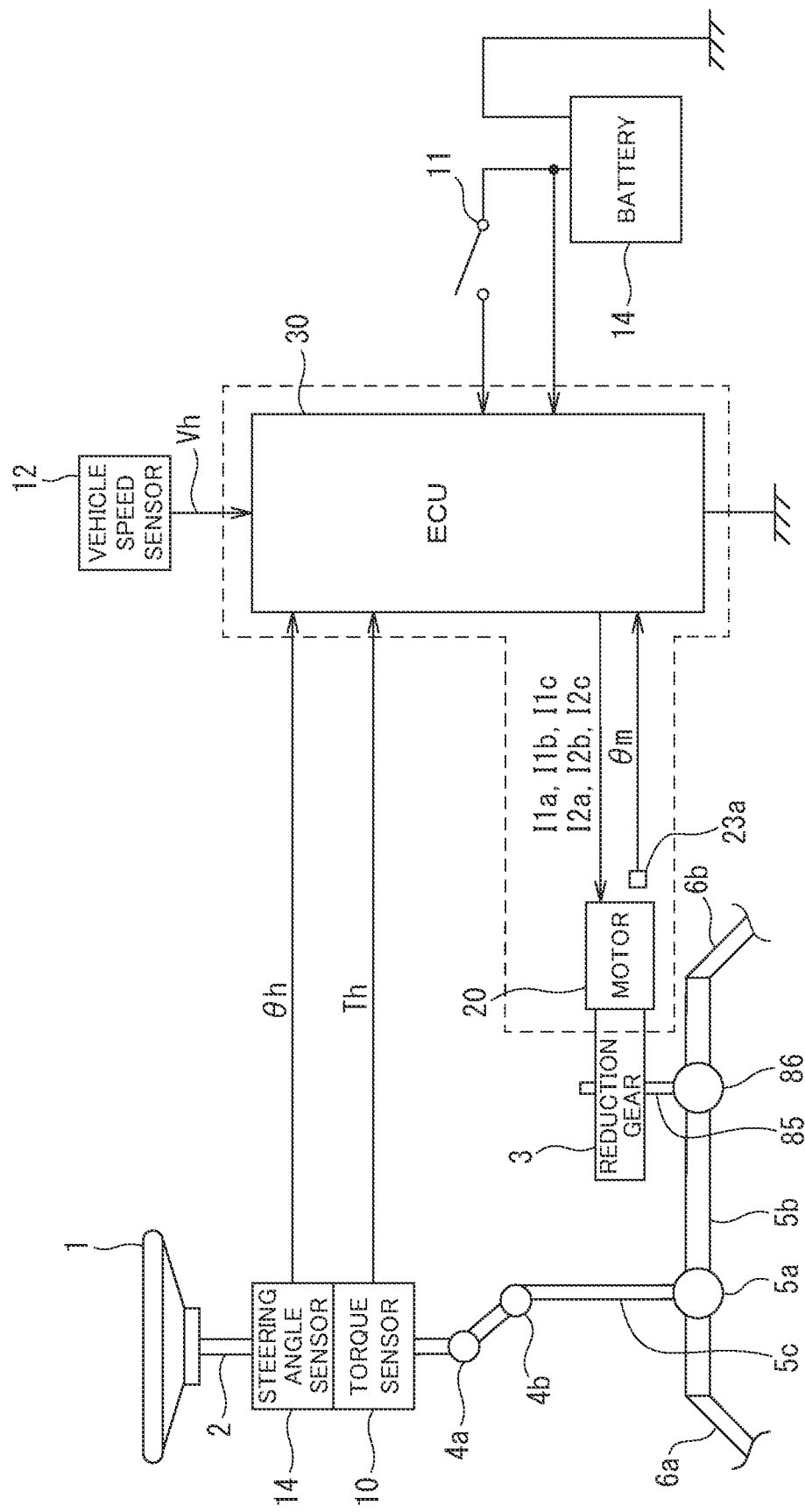
FIG. 20 is a configuration diagram illustrative of an outline of a third variation of the electric power steering device.

Note that, in the case of the downstream assist system, a motor 20, a rotation angle sensor 23a, and an ECU 30 may, instead of being formed as separate entities, be formed as a motor control unit (MCU) having a monolithic structure as a waterproof measure, as illustrated by a dashed line in FIGS. 18 to 20.

FIG. 18 illustrates a configuration example in which the motor control device of the present invention is applied to an electric power steering device using the single pinion assist system. A steering wheel 1 is connected to a universal joint 4a at one end of an intermediate shaft via a steering shaft 2. In addition, to a universal joint 4b at the other end, an input-side shaft 4c of a torsion bar (not illustrated) is coupled.

A pinion rack mechanism 5 includes a pinion gear (pinion) 5a, a rack bar (rack) 5b, and a pinion shaft 5c. The input-side shaft 4c and the pinion rack mechanism 5 are connected by the torsion bar (not illustrated) that is twisted due to a difference in rotation angles between the input-side shaft 4c and the pinion rack mechanism 5. A torque sensor 10 electromagnetically measures a torsion angle of the torsion bar as steering torque Th of the steering wheel 1.

To the pinion shaft 5c, a motor 20 assisting steering force of the steering wheel 1 is connected via a reduction gear 3, and the rotation angle sensor 23a calculates rotation angle information of a motor rotation shaft of the motor 20, as with the above-described embodiments.

FIG. 19 illustrates a configuration example in which the motor control device of the present invention is applied to an electric power steering device using the rack assist system. A spiral groove (not illustrated) is formed on an outer circumferential surface of a rack bar 5b, and a spiral groove (not illustrated) having a similar lead to that of the spiral groove of the rack bar 5b is also formed on an inner circumferential surface of a nut 81. By a plurality of rolling elements being arranged in a rolling path formed by the spiral grooves, a ball screw is formed.

A belt 84 is wound around a driving pulley 82 coupled to a rotation shaft 20a of a motor 20 assisting steering force of a steering wheel 1 and a driven pulley 83 coupled to the nut 81, and rotational motion of the rotation shaft 20a is converted to linear motion of the rack bar 5b. A rotation angle sensor 23a calculates rotation angle information of a motor rotation shaft of the motor 20, as with the above-described embodiments.

FIG. 20 illustrates a configuration example in which the motor control device of the present invention is applied to an electric power steering device using the dual pinion assist system. The electric power steering device using the dual pinion assist system includes, in addition to a pinion shaft 5c and a pinion gear 5a, a second pinion shaft 85 and a second pinion gear 86, and a rack bar 5b includes a first rack teeth (not illustrated) that mesh with the pinion gear 5a and a second rack teeth (not illustrated) that mesh with the second pinion gear 86.

To the second pinion shaft 85, a motor 20 assisting steering force of a steering wheel 1 is connected via a reduction gear 3, and a rotation angle sensor 23a calculates rotation angle information of a motor rotation shaft of the motor 20, as with the above-described embodiments.

REFERENCE SIGNS LIST

1 Steering wheel
2 Steering shaft
3 Reduction gear
4a, 4b Universal joint
4c Input-side shaft
5 Pinion rack mechanism
5a Pinion gear (pinion)
5b Rack bar (rack)
5c Pinion shaft
6a, 6b Tie rod
7a, 7b Hub unit
8L, 8R Steered wheel
10 Torque sensor
11 Ignition switch
12 Vehicle speed sensor
13 Battery
14 Steering angle sensor
20 Motor
23 Motor rotation angle detection circuit
30 Electronic control unit
31 Control calculation device
31a A/D conversion unit
31b Temperature measurement unit
33A First motor current cut-off circuit
33B Second motor current cut-off circuit
39A1, 39A2, 39B1, 39B2, 39C1, 39C2 Current detection circuit
41A First gate drive circuit
41B Second gate drive circuit
42A First power conversion circuit
42B Second power conversion circuit
44A First power source cut-off circuit
44B Second power source cut-off circuit
45 Temperature detection circuit, first temperature detection circuit
45a Temperature sensor, first temperature sensor
46 Second temperature detection circuit
46a Second temperature sensor
50 ECU temperature measurement unit 51 Sensor abnormality determination unit
52 ECU temperature estimation unit
53 Rise value estimation unit
54 Adder
55 Motor temperature estimation unit
60 Current command value calculation unit
61 First current limiting unit
62, 63 Subtracter
64 Second current limiting unit
65 PI control unit
66 Two-phase/three-phase conversion unit
67 Three-phase/two-phase conversion unit
68 Angular velocity conversion unit
70 Circuit board
72 Heat dissipation member
73, 74 Thermal interface material (TIM)
81 Nut
82 Driving pulley
83 Driven pulley
84 Belt
85 Second pinion shaft
86 Second pinion gear

The invention claimed is:

1. A motor control device comprising:
a circuit board;
a first power conversion circuit mounted on the circuit board and configured to supply current to drive a motor;
a second power conversion circuit mounted on the circuit board and configured to supply current to drive a motor identical to or different from a motor to which current is supplied by the first power conversion circuit;
a temperature detection circuit including a temperature detection element; and
a control circuit configured to limit current supplied by the first power conversion circuit and current supplied by the second power conversion circuit, based on temperature detected by the temperature detection circuit,
wherein the temperature detection element is mounted on the circuit board on which the first power conversion circuit and the second power conversion circuit are mounted and are arranged at a position between the first power conversion circuit and the second power conversion circuit.

2. The motor control device according to claim 1, wherein a surface of a switching element included in the first power conversion circuit on an opposite side to the circuit board, a surface of a switching element included in the second power conversion circuit on an opposite side to the circuit board, and a surface of the temperature detection element on an opposite side to the circuit board are thermally connected to a same heat dissipation member.

3. The motor control device according to claim 1, wherein the temperature detection element is arranged substantially at a center of the circuit board in an arrangement direction in which the first power conversion circuit and the second power conversion circuit are arranged on the circuit board.

4. The motor control device according to claim 1 comprising
a first temperature detection element and a second temperature detection element as the temperature detection elements,
wherein the control circuit determines whether or not the temperature detection circuit is abnormal based on a difference between detected temperature depending on output from the first temperature detection element and detected temperature depending on output from the second temperature detection element, and
the first temperature detection element and the second temperature detection element are arranged close to each other.

5. The motor control device according to claim 4, wherein the first temperature detection element and the second temperature detection element are temperature detection elements having a same structure, and the first temperature detection element and the second temperature detection element are mounted on the circuit board in such a way as to be oriented in different directions from each other.

6. An electric power steering device comprising:
the motor control device according to claim 4; and
a motor controlled by the motor control device,
wherein the electric power steering device provides a steering system of a vehicle with steering assist force by the motor.

7. The motor control device according to claim 1 comprising
a first temperature detection element and a second temperature detection element as the temperature detection elements,
wherein the control circuit determines whether or not the temperature detection circuit is abnormal based on a difference between detected temperature depending on output from the first temperature detection element and detected temperature depending on output from the second temperature detection element, and
a surface of the first temperature detection element on an opposite side to the circuit board and a surface of the second temperature detection element on an opposite side to the circuit board are thermally connected to a same heat dissipation member.

8. The motor control device according to claim 7, wherein a surface of a switching element included in the first power conversion circuit on an opposite side to the circuit board, a surface of a switching element included in the second power conversion circuit on an opposite side to the circuit board, a surface of the first temperature detection element on an opposite side to the circuit board, and a surface of the second temperature detection element on an opposite side to the circuit board are thermally connected to the same heat dissipation member.

9. The motor control device according to claim 7, wherein the first temperature detection element and the second temperature detection element are temperature detection elements having a same structure, and the first temperature detection element and the second temperature detection element are mounted on the circuit board in such a way as to be oriented in different directions from each other.

10. An electric power steering device comprising:
the motor control device according to claim 7; and
a motor controlled by the motor control device,
wherein the electric power steering device provides a steering system of a vehicle with steering assist force by the motor.

11. An electric power steering device comprising:
the motor control device according to claim 1 and
a motor controlled by the motor control device,
wherein the electric power steering device provides a steering system of a vehicle with steering assist force by the motor.

* * * * *